United States Patent
Kanaguchi

(10) Patent No.: US 10,703,276 B2
(45) Date of Patent: Jul. 7, 2020

(54) VEHICULAR DISPLAY SYSTEM

(71) Applicant: HONDA MOTOR CO., LTD., Tokyo (JP)

(72) Inventor: Yutaka Kanaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 16/125,964

(22) Filed: Sep. 10, 2018

(65) Prior Publication Data

US 2019/0077313 A1 Mar. 14, 2019

(30) Foreign Application Priority Data

Sep. 11, 2017 (JP) ................. 2017-174410

(51) Int. Cl.
| | |
|---|---|
| B60R 1/00 | (2006.01) |
| G02F 1/133 | (2006.01) |
| H04N 7/18 | (2006.01) |
| G02F 1/1334 | (2006.01) |
| B60R 1/12 | (2006.01) |
| B60K 35/00 | (2006.01) |

(52) U.S. Cl.
CPC ............. *B60R 1/002* (2013.01); *B60K 35/00* (2013.01); *B60R 1/12* (2013.01); *G02F 1/1334* (2013.01); *G02F 1/13306* (2013.01); *H04N 7/181* (2013.01); *B60K 2370/152* (2019.05); *B60K 2370/27* (2019.05); *B60K 2370/334* (2019.05); *B60R 2001/1253* (2013.01); *B60R 2300/205* (2013.01); *B60R 2300/70* (2013.01)

(58) Field of Classification Search
CPC ...... B60J 1/00; B60J 7/08; B60Q 1/24; B60Q 1/2619; B60Q 1/2657; B60Q 1/2661; B60Q 1/2665; B60Q 1/2684; B60Q 1/30; B60Q 1/302; B60Q 1/323; B60Q 1/503; B60R 1/00; G09F 13/02; G09F 21/048; G09F 9/302; G09G 2360/144; G09G 2380/10; G09G 3/36; H04N 7/181
See application file for complete search history.

(56) References Cited

U.S. PATENT DOCUMENTS

| | | | | |
|---|---|---|---|---|
| 5,825,281 A | * | 10/1998 | McCreary | ............ B60Q 1/2611 340/425.5 |
| 6,124,647 A | * | 9/2000 | Marcus | ............... B60C 23/0401 307/10.1 |

(Continued)

FOREIGN PATENT DOCUMENTS

JP    2016-012117 A    1/2016

*Primary Examiner* — Peter D Le
(74) *Attorney, Agent, or Firm* — Rankin, Hill & Clark LLP

(57) ABSTRACT

A vehicular display system is provided that is capable of achieving both display performance of images or videos and viewability as a window in a non-display mode. The vehicular display system includes: a window that is a transparent plate mounted on a vehicle; a liquid crystal unit that is arranged on the inner surface, in the inside/outside direction of the vehicle, of the window and has changeable levels of transparency; a projector that projects images or videos onto the liquid crystal unit; and a control unit that controls the liquid crystal unit and the projector, wherein the control unit controls the projector in a state of the liquid crystal unit being translucent, to cause the projector to project images or videos onto the liquid crystal unit.

8 Claims, 22 Drawing Sheets

(56) References Cited

U.S. PATENT DOCUMENTS

| | | | |
|---|---|---|---|
| 6,854,785 B2 * | 2/2005 | Simon | B60J 5/0416 296/146.7 |
| 2002/0159270 A1 * | 10/2002 | Lynam | B60K 35/00 362/492 |
| 2003/0043480 A1 * | 3/2003 | Burgner | B60R 1/12 359/844 |
| 2004/0189947 A1 * | 9/2004 | Hattori | B60R 11/0235 353/13 |
| 2004/0231208 A1 * | 11/2004 | Pitt | G09F 21/04 40/590 |
| 2005/0024293 A1 * | 2/2005 | Sakata | H01L 51/5262 345/30 |
| 2006/0028453 A1 * | 2/2006 | Kawabe | G06F 3/041 345/173 |
| 2006/0143957 A1 * | 7/2006 | Salehi | G09F 19/18 40/590 |
| 2006/0207141 A1 * | 9/2006 | Pitt | G09F 21/04 40/590 |
| 2007/0146481 A1 * | 6/2007 | Chen | B60R 1/12 348/148 |
| 2009/0015736 A1 * | 1/2009 | Weller | B60R 1/12 349/11 |
| 2009/0132130 A1 * | 5/2009 | Kumon | B60K 35/00 701/49 |
| 2009/0243824 A1 * | 10/2009 | Peterson | B60R 1/12 340/435 |
| 2010/0066925 A1 * | 3/2010 | Nagahara | G02B 27/01 349/11 |
| 2010/0097448 A1 * | 4/2010 | Gilbert | B60K 35/00 348/51 |
| 2010/0144432 A1 * | 6/2010 | Nittou | A63F 7/022 463/30 |
| 2010/0289634 A1 * | 11/2010 | Ikeda | B60Q 9/005 340/441 |
| 2010/0289995 A1 * | 11/2010 | Hwang | B60R 1/00 349/114 |
| 2011/0115990 A1 * | 5/2011 | Bhaktiar | B60R 11/0235 348/794 |
| 2012/0262288 A1 * | 10/2012 | Moussa | B60Q 1/2665 340/475 |
| 2014/0285666 A1 * | 9/2014 | O'Connell | B60R 1/12 348/148 |
| 2015/0009163 A1 * | 1/2015 | Nakai | G01C 21/3664 345/173 |
| 2015/0062141 A1 * | 3/2015 | Hayasaka | B60R 1/00 345/581 |
| 2016/0170487 A1 * | 6/2016 | Saisho | G01C 21/3635 345/156 |
| 2016/0280136 A1 * | 9/2016 | Besson | B60R 1/00 |
| 2016/0355133 A1 * | 12/2016 | Kim | G02B 27/01 |
| 2016/0379422 A1 * | 12/2016 | Kahn | G01D 7/00 701/36 |
| 2017/0011709 A1 * | 1/2017 | Kuwabara | B60K 35/00 |
| 2018/0231772 A1 * | 8/2018 | Han | G02B 27/0101 |
| 2019/0299784 A1 * | 10/2019 | Nakano | B60W 50/14 |

* cited by examiner

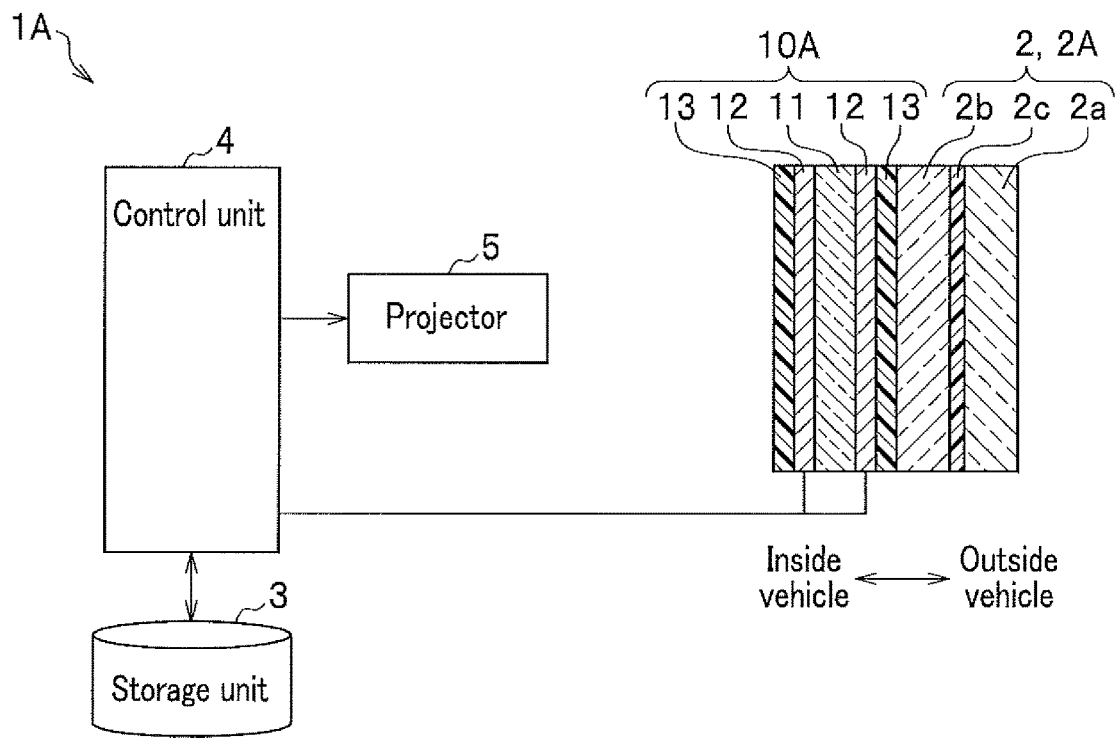
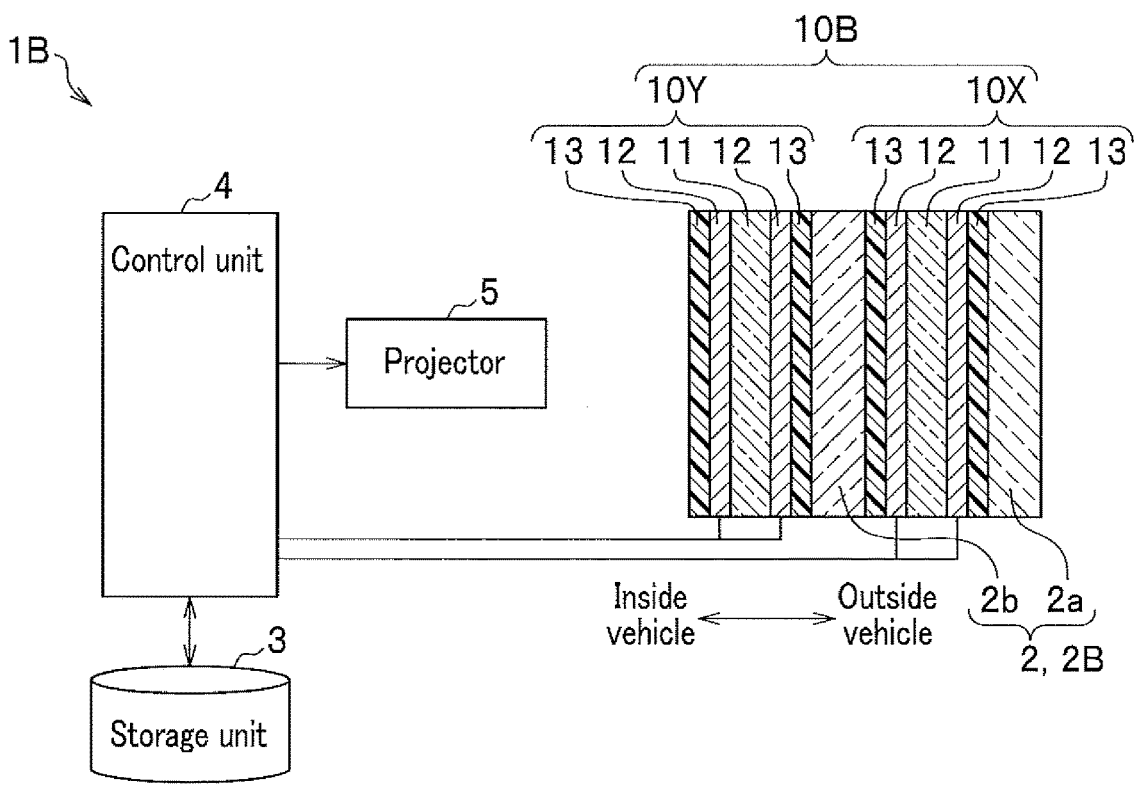

VEHICULAR DISPLAY SYSTEM

CROSS-REFERENCE TO RELATED APPLICATION

This application claims the benefit of priority to Japanese Patent Application No. 2017-174410 filed 11 Sep. 2017, the disclosures of all of which are hereby incorporated by reference in their entireties.

TECHNICAL FIELD

The present invention relates to a display system for a vehicle.

BACKGROUND OF THE INVENTION

As a technique of projecting an image or the like on a window of a vehicle, Japanese Patent Application Publication No. 2016-012117 discloses a technique in which an image projection film is provided between laminated glasses to allow a person outside the vehicle to view an image projected so as to be focused on the image projection film.

SUMMARY OF THE INVENTION

Problems to be Solved

In such a technique, viewability as a window improves but the visibility of an image reduces if the image projection film has high transparency, while the visibility of an image improves but viewability as a window reduces if the image projection film has low transparency.

The present invention has been made in view of the above problem to provide a vehicular display system that achieves both display performance of images or videos and viewability as a window in a non-display mode.

Solution to Problem

In order to solve the above-mentioned problems, a vehicular display system of the present invention includes: a window that is a transparent plate mounted on a vehicle; a liquid crystal unit that is arranged on the inner surface, in the inside/outside direction of the vehicle, of the window and has changeable levels of transparency; a projector that projects images or videos onto the liquid crystal unit; and a control unit that controls the liquid crystal unit and the projector, wherein the control unit controls the projector in a state of the liquid crystal unit being translucent, to cause the projector to project images or videos onto the liquid crystal unit.

Advantageous Effects of the Invention

The present invention achieves both display performance of images or videos and viewability as a window in a non-display mode.

BRIEF DESCRIPTION OF DRAWINGS

FIG. 1 is a block diagram schematically showing a vehicular display system according to a first embodiment of the present invention;

FIG. 2 is a block diagram schematically showing a vehicular display system according to a second embodiment of the present invention;

EMBODIMENTS OF THE INVENTION

Figure 3:
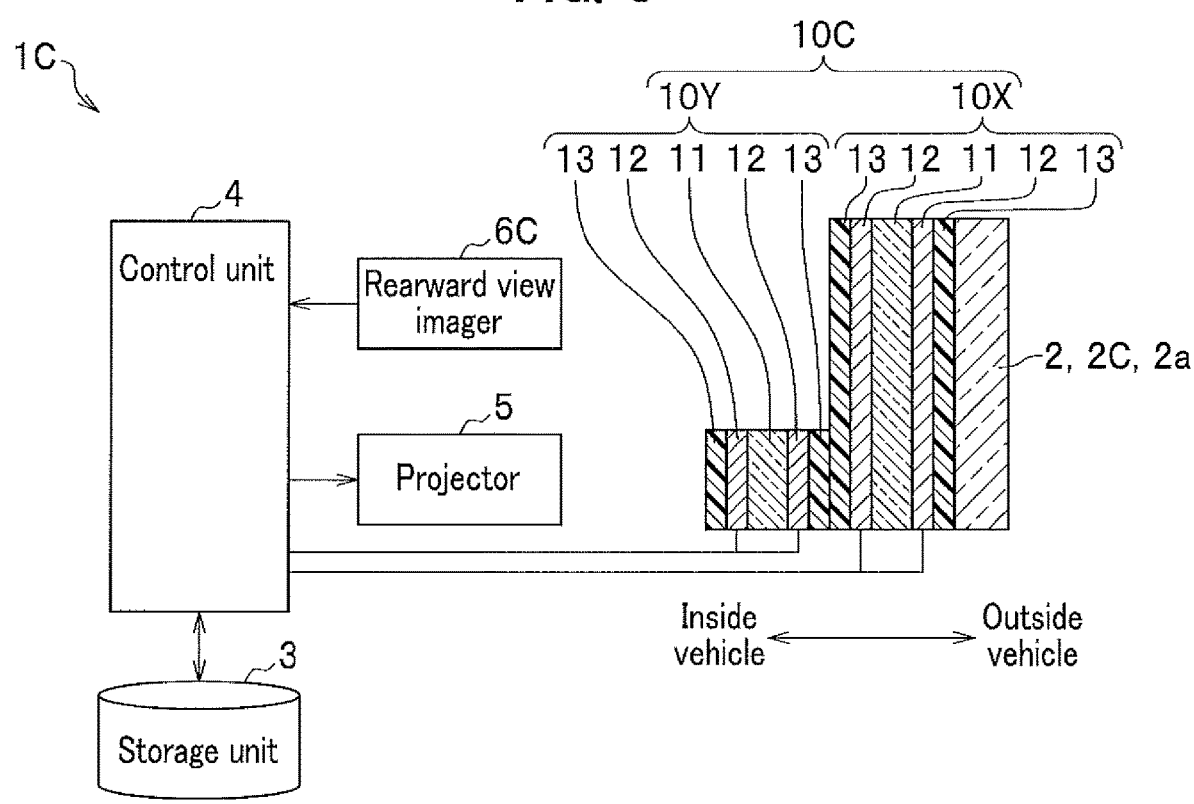
FIG. 3 is a block diagram schematically showing a vehicular display system according to a third embodiment of the present invention.

Embodiments of the present invention will be described in detail with reference to the drawings. In the description, the same elements are denoted by the same reference numerals, and duplicate descriptions thereof are omitted. Note that directions indicated by arrowed lines in the drawings are such that the "front-rear" indicates the longitudinal direction of the vehicle body, the "up-down" indicates the vertical direction of the vehicle body, and the "right-left" indicates the lateral direction (vehicle width direction) as viewed from the driver seat.

First Embodiment

As shown in FIG. 1, a vehicular display system 1A according to a first embodiment of the present invention includes a window 2 (2A), a liquid crystal unit 10A, a storage unit 3, a control unit 4, and a projector 5.

<Window>

The window 2 is a plate-like member made of transparent glass or transparent resin and provided on the front face of a vehicle, or the like. Examples of the window 2 include:

a front window that is provided on the front face of a vehicle;

a front quarter window that is provided on a side face of a vehicle at the front end of a side door for the front seat (driver seat, front passenger seat) so as to be unopenable;

a front door window that is provided on a side face of a vehicle in a side door for the front seat (driver seat, front passenger seat) so as to be opened and closed;

a rear door window that is provided on a side face of a vehicle in a side door for the rear seat so as to be opened and closed;

a rear quarter window that is provided on a side face of a vehicle at the rear end of a side door for the rear seat so as to be unopenable;

a roof window that is provided on the ceiling face of a vehicle;

a rear window that is provided on the rear face of a vehicle; and an extra window that is provided on the rear face of a vehicle below the rear window.

Here, the window 2A as a front window or the like, for example, includes a first window layer 2a on the outer side of a vehicle, a second window layer 2b on the inner side of a vehicle, and an intermediate film 2c provided between the first window layer 2a and the second window layer 2b. Each of the first window layer 2a and the second window layer 2b is a plate-like member made of transparent glass or transparent resin. The intermediate film 2c is a transparent resin film thinner than any of the window layers 2a, 2b.

<Liquid Crystal Unit>

The liquid crystal unit 10A is arranged all over the inner surface, in the inside/outside direction of the vehicle, of the window 2 (inner surface, in the inside/outside direction of the vehicle, of the second window layer 2b in the case of a front window or the like), and includes a liquid crystal layer 11, a pair of transparent electrode layers 12 provided on both sides of the liquid crystal layer 11, and a pair of sealing layers 13 provided so as to sandwich the transparent electrode layers 12. The liquid crystal layer 11 is formed by dispersing liquid crystal molecules in a polymer. The transparent electrode layer 12 is a colorless, transparent conductive layer formed such as by a conductive coating material. The sealing layer 13 is a colorless, transparent insulating layer formed such as by an insulating resin (PET, PolyEthylene Terephthalate resin, or the like).

In the present embodiment, the liquid crystal unit 10A is configured to be normally black. That is, the liquid crystal unit 10A is colorless and transparent (high transparency) in a state of the liquid crystal layer 11 being energized through the pair of transparent electrode layers (i.e., during energization). In contrast, the liquid crystal unit 10A is white translucent or gray translucent (low transparency) in a state of the liquid crystal layer 11 not being energized (i.e., when not energized). Note that if the liquid crystal unit 10A is configured to be normally white, the energization control is reversed.

<Storage Unit>

The storage unit 3 is composed of a hard disk, for example. The storage unit 3 stores display data for displaying images or videos.

<Control Unit>

The control unit 4 includes a CPU (Central Processing Unit), a ROM (Read-Only Memory), a RAM (Random Access Memory), an input/output circuit, and the like. The control unit 4 controls the liquid crystal unit 10A based on an operation result of an ignition switch or the like. In addition, the control unit 4 controls the projector 5 using the display data stored in the storage unit 3 or the display data acquired from an external device.

<Projector>

The projector 5 is provided inside or outside the passenger compartment of a vehicle to project an image or a video on the liquid crystal unit 10A. Two or more projectors 5 may be provided, or the projector 5 may be of a movable type so that projection can be directed to different spots. In addition, the projector 5 may be composed of a robot capable of autonomously traveling inside the vehicle. Setup cases of the projector 5 will be described later in detail.

The vehicular display system 1A further includes a power supply to supply electric power to the liquid crystal unit 10A and the projector 5. The power supply may be a battery dedicated to the vehicular display system 1A or may be a battery for starting an engine of a vehicle. A vehicle employing the vehicular display system 1A can be any of a gasoline car, an HEV (Hybrid Electric Vehicle), a PHEV (Plug-in Hybrid Electric Vehicle), and an EV (Electric Vehicle), and preferably includes a charge port in the vehicle body for charging the battery.

<Exemplary Control Operation>

The control unit 4 controls the liquid crystal unit 10A to set the liquid crystal unit 10A colorless and transparent (energization ON), or to set the liquid crystal unit 10A white translucent or gray translucent (energization OFF). In addition, the control unit 4 controls the projector 5 using the display data stored in the storage unit 3 to project an image or a video on the liquid crystal unit 10A in white translucent or gray translucent so as to be displayed. The displayed image or video is viewable by one or more passengers inside the vehicle and/or people outside the vehicle.

The control unit 4 turns off energizing the liquid crystal unit 10A when the vehicle is parked (based on the ignition switch being OFF, the shift lever being put in Parking, or the like), to set the liquid crystal unit 10A white translucent or gray translucent. In addition, the control unit 4 turns on energizing the liquid crystal unit 10A when the vehicle is driven (based on the ignition switch being ON, door being opened by a passenger getting inside the vehicle, or the like), to set the liquid crystal unit 10A colorless and transparent. In the state of energizing the liquid crystal unit 10A being turned off, the window 2 provided with the liquid crystal unit 10A serves to prevent the cabin temperature from increasing and shielding light for protecting the privacy in the passenger compartment. Also in the state of energizing the liquid crystal unit 10A being turned off, mainly the front window and the roof window of the windows 2 provided with the liquid crystal units 10A serve as screens to which images or videos are projected so as to be viewed by one or more passengers inside the vehicle. Still in the state of energizing the liquid crystal unit 10A being turned off, the front window, the front door window, the rear door window, the rear window, and the extra window of the windows 2 provided with the liquid crystal unit 10 serve as screens to which images or videos are projected so as to be viewed by people outside the vehicle.

The vehicular display system 1A according to the first embodiment of the present invention includes: the window 2 that is a transparent plate attached to a vehicle; the liquid crystal unit 10A that is arranged on the inner side, in the inside/outside direction of the vehicle, of the window 2 and has changeable levels of transparency; the projector 5 that projects an image or a video onto the liquid crystal unit 10A; and the control unit 4 that controls the liquid crystal unit 10A and the projector 5, wherein the control unit 4 controls the projector 5 in a state of the liquid crystal unit 10A being translucent to display an image or a video on the liquid crystal unit 10A. Accordingly, the vehicular display system 1A reduces transparency of the liquid crystal unit 10A when an image or a video is displayed, to improve display performance, and increases transparency of the liquid crystal unit 10A when no image or video is displayed, such as during the vehicle is driven, to improve viewability.

Second Embodiment

A vehicular display system according to a second embodiment of the present invention will be described focusing on differences from the vehicular display system 1A according to the first embodiment. As shown in FIG. 2, a vehicular display system 1B according to the second embodiment of the present invention includes a window 2B instead of the window 2A, and includes a liquid crystal unit 10B having a first liquid crystal unit 10X and a second liquid crystal unit 10Y.

<Window>

The window 2B as a front window or the like, for example, includes no intermediate film 2c (see FIG. 1), and has the liquid crystal unit 10X arranged in the place of the intermediate film 2c, that is, between the first window layer 2a and the second window layer 2b.

<First Liquid Crystal Unit and Second Liquid Crystal Unit>

The first liquid crystal unit 10X is arranged between the first window layer 2a and the second window layer 2b, that is, over the entire inner surface, in the inside/outside direction of the vehicle, of the first window layer 2a and includes the liquid crystal layer 11, the pair of transparent electrode layers 12 provided on both sides of the liquid crystal layer 11, and the pair of sealing layers 13 provided so as to sandwich the transparent electrode layers 12. The second liquid crystal unit 10Y is arranged over the entire inner surface, in the inside/outside direction of the vehicle, of the second window layer 2b and includes the liquid crystal layer 11, the pair of transparent electrode layers 12 provided on both sides of the liquid crystal layer 11, and the pair of sealing layers 13 provided so as to sandwich the transparent electrode layers 12. In this manner, the second liquid crystal unit 10Y is arranged on the inner side, in the inside/outside direction of the vehicle, of the first liquid crystal unit 10X so as to be separated by the thickness of the second window layer 2b.

In the state of each of the first and second liquid crystal units 10X, 10Y not being energized, the first liquid crystal unit 10X may have the same color tone or the same transparency level as the second liquid crystal unit 10Y, or may have darker color tone (with the same transparency, for instance) or a lower transparency level than the second liquid crystal unit 10Y (e.g., the first liquid crystal unit 10X is gray translucent, and the second liquid crystal unit 10Y is white translucent). Such setting of the color tone and/or the transparency level are implemented through such as types of the liquid crystal layer 11 and the sealing layer 13 of each of the first and second liquid crystal units 10X, 10Y.

<Projector>

In the present embodiment, the projector 5 projects images or videos from inside of the passenger compartment onto the second liquid crystal unit 10Y, <Exemplary Control Operation>

While the vehicle is in operation (ignition switch has been turned on), if one or more passengers want to see the scenery, the control unit 4 turns on energizing the first and second liquid crystal units 10X, 10Y to set the first and second liquid crystal units 10X, 10Y colorless and transparent.

In addition, in the case of serving the function of preventing the cabin temperature from increasing and shielding light for protecting the privacy in the passenger compartment, the control unit 4 turns off energizing at least the first liquid crystal unit 10X to set the first liquid crystal unit 10X gray translucent.

Further, in the case of serving the function of allowing people outside the vehicle to view images or videos, the control unit 4 turns on energizing the first liquid crystal unit 10X and turns off energizing the second liquid crystal unit 10Y. Then, the control unit 4 causes the projector 5 to project images or videos onto the second liquid crystal unit 10Y.

Still further, in the case of serving the function of allowing one or more passengers inside the vehicle to view images or videos, the control unit 4 turns off energizing the first liquid crystal unit 10X and the second liquid crystal unit 10Y. Then, the control unit 4 causes the projector 5 to project images or videos onto the second liquid crystal unit 10Y which is now white translucent. In this case, the first liquid crystal unit 10X, which is separated from the second liquid crystal unit 10Y by the thickness of the second window layer 2b, is now gray translucent, to serve the function of shielding light for privacy in the passenger compartment.

Still further, when the vehicular display system 1B is not used (ignition switch is turned off, or the like), the control unit 4 also turns off energizing the first liquid crystal unit 10X and the second liquid crystal unit 10Y.

Still further, in the case of serving the function of allowing people outside the vehicle to view images or videos, and allowing one or more passengers of the vehicle to view images or videos, the control unit 4 also turns off energizing the first liquid crystal unit 10X and the second liquid crystal unit 10Y. Then, the control unit 4 causes the projector 5 provided in the passenger compartment to project images or videos onto the second liquid crystal unit 10Y which is now white translucent. Additionally, the control unit 4 may cause another projector 5 provided outside the vehicle compartment to project images or videos onto the first liquid crystal unit 10X which is now gray translucent.

In the vehicular display system 1B according to the second embodiment of the present invention, the liquid crystal unit 10B includes: the first liquid crystal unit 10X that is provided on the inner side, in the inside/outside direction of the vehicle, of the window (first window layer 2a); and the second liquid crystal unit 10Y that is provided on the inner side, in the inside/outside direction of the vehicle, of the first liquid crystal unit 10X so as to be separated from the first liquid crystal unit 10X, and the control unit 4 controls the first liquid crystal unit 10X and the second liquid crystal unit 10Y, and controls the projector 5, in the state of the second liquid crystal unit 10Y being translucent, so that images or videos are displayed on the second liquid crystal unit 10Y. Therefore, the vehicular display system 1B is capable of allowing one or more passengers of the vehicle to view images or videos and protecting privacy in the vehicle compartment.

In the vehicular display system 1B according to the second embodiment of the present invention, the first liquid crystal unit 10X can be set to have a darker color tone or a lower transparency level than the second liquid crystal unit 10Y. Then, the vehicular display system 1B is capable of protecting privacy in the vehicle compartment more preferably when one or more passengers of the vehicle view images or videos.

Third Embodiment

Next, a vehicular display system according to a third embodiment of the present invention will be described, focusing on differences from the vehicular display system 1B according to the second embodiment. As shown in FIG. 3, in a vehicular display system 1C according to the third embodiment of the present invention, a window 2C is a front door window in the absence of a front quarter window, and is composed of the first window layer 2a. In a liquid crystal unit 10C, the first liquid crystal unit 10X is provided on the entire inner surface, in the inside/outside direction of the vehicle, of the window 2C, while the second liquid crystal unit 10Y is provided only on part of the inner surface, in the inside/outside direction of the vehicle, of the first liquid crystal unit 10X. More specifically, the second liquid crystal unit 10Y is provided between an eyepoint, which is a point (or region) representing the level of the eyes of the driver, and a door mirror DM of the vehicle.

<Rearward View Imager>

In addition, the vehicular display system 1C includes a rearward view imager 6C that images rearward view of the vehicle and outputs an imaged result to the control unit 4.

<Projector>

In the present embodiment, the projector 5 projects images or videos from inside of the vehicle compartment onto the second liquid crystal unit 10Y.

<Exemplary Control Operation>

While the vehicle is in operation (ignition switch has been turned on), if one or more passengers want to see the scenery, the control unit 4 turns on energizing the first liquid crystal unit 10X and the second liquid crystal unit 10Y to set the first liquid crystal unit 10X and the second liquid crystal unit 10Y colorless and transparent.

Figure 4:
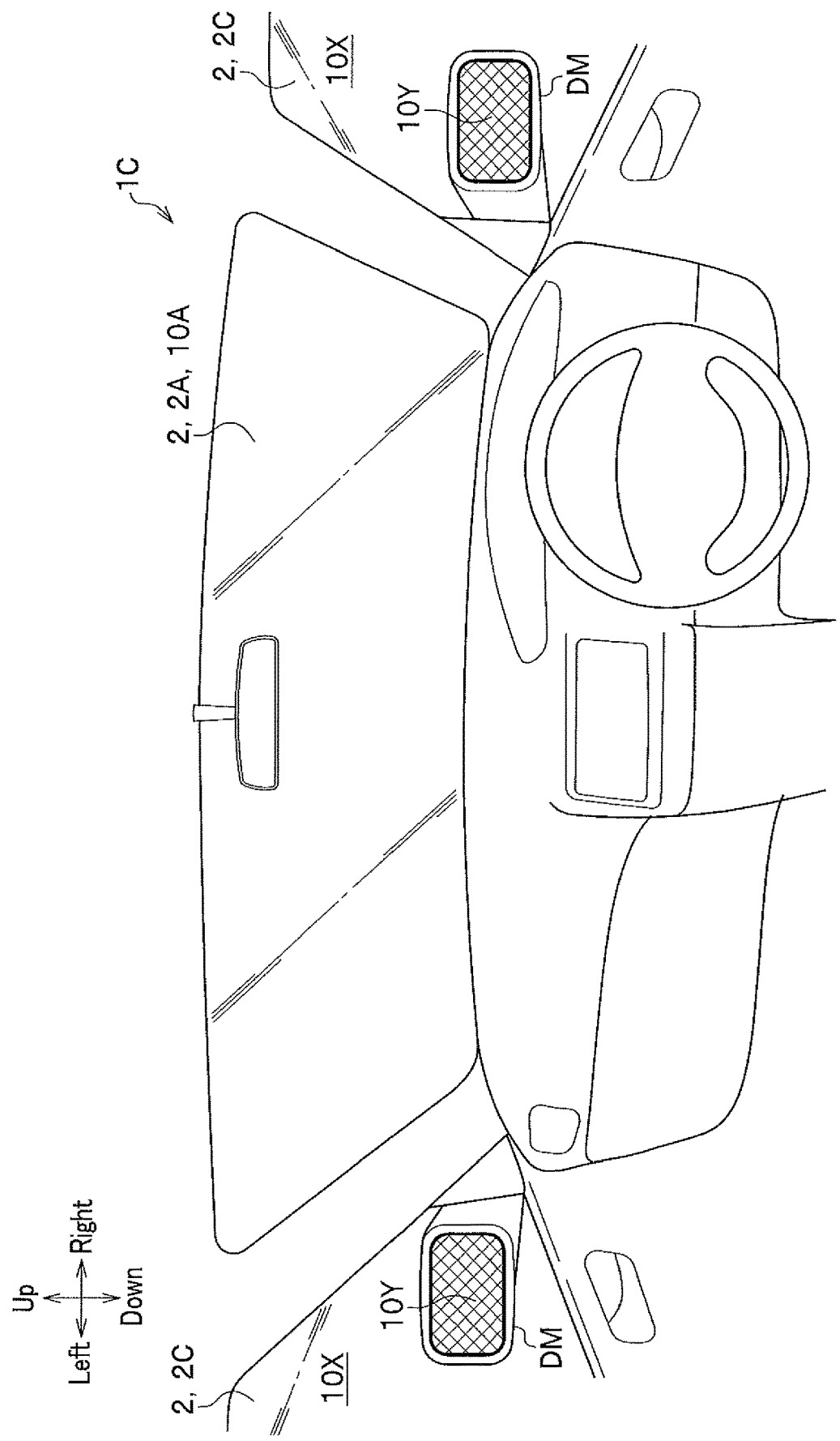
FIG. 4 is a diagram schematically showing display areas in a vehicular display system according to the third embodiment of the present invention.

In addition, while the vehicle is in operation (ignition switch has been turned on), the control unit 4 turns on energizing the first liquid crystal unit 10X and turns off energizing the second liquid crystal unit 10Y to set the first liquid crystal unit 10X colorless and transparent and to set the second liquid crystal unit 10Y white translucent. Then, the control unit 4 controls the projector 5 to project the imaged result by the rearward view imager 6C onto the second liquid crystal unit 10Y. Here, the control unit 4 converts the imaged result by the rearward view imager 6C into that having such as the same angle of view as the view reflected by the door mirror DM to be seen by the driver, so as to be displayed on the second liquid crystal unit 10Y (see FIG. 4). Such control is executed by the driver operating an operation unit (switches, buttons, etc.). Additionally, such control allows the second liquid crystal unit 10Y to alternatively provide the function of the door mirror DM, when viewability in the door mirror DM is deteriorated due to such as raindrop or frost, in the case of the vehicle having no door mirror DM, or the like.

Further, the control unit 4 turns off energizing the first liquid crystal unit 10X and turns on energizing the second liquid crystal unit 10Y, in the case of providing a function of allowing people outside the vehicle to view images or videos. Then, the control unit 4 causes the projector 5 to project images or videos onto the first liquid crystal unit 10X which is now white translucent.

Furthermore, when the vehicular display system 1C is not in use (ignition switch has been turned off, or the like), the control unit 4 turns off energizing the first liquid crystal unit 10X and the second liquid crystal unit 10Y. Such control is applicable to the windows 2C which is a pair of right and left front door windows. Additionally, the first liquid crystal unit 10X can be omitted.

The vehicular display system 1C according to the third embodiment of the present invention includes a front door window as the window 2C and a rearward view imager 6C that images rearward view of the vehicle, and the liquid crystal unit 10C includes: a third liquid crystal unit (first liquid crystal unit 10X) provided on the inner side, in the inside/outside direction of the vehicle, of a front door window; and a fourth liquid crystal unit (second liquid crystal unit 10Y) provided on the inner side, in the inside/outside direction of the vehicle, of a part of the third liquid crystal unit (first liquid crystal unit 10X), and the control unit 4 controls the third liquid crystal unit (first liquid crystal unit 10X), the fourth liquid crystal unit (second liquid crystal unit 10Y), and the projector 5 so that the imaged result by the rearward view imager 6C is displayed on the fourth liquid crystal unit (second liquid crystal unit 10Y), in the state that the third liquid crystal unit (first liquid crystal unit 10X) has higher transparency than the fourth liquid crystal unit (second liquid crystal unit 10Y). Then, the vehicular display system 1C achieves both display performance of images or videos and viewability as the window 2 in a non-display mode, and further executes the function of the door mirror DM alternatively.

Fourth Embodiment

Figure 5:
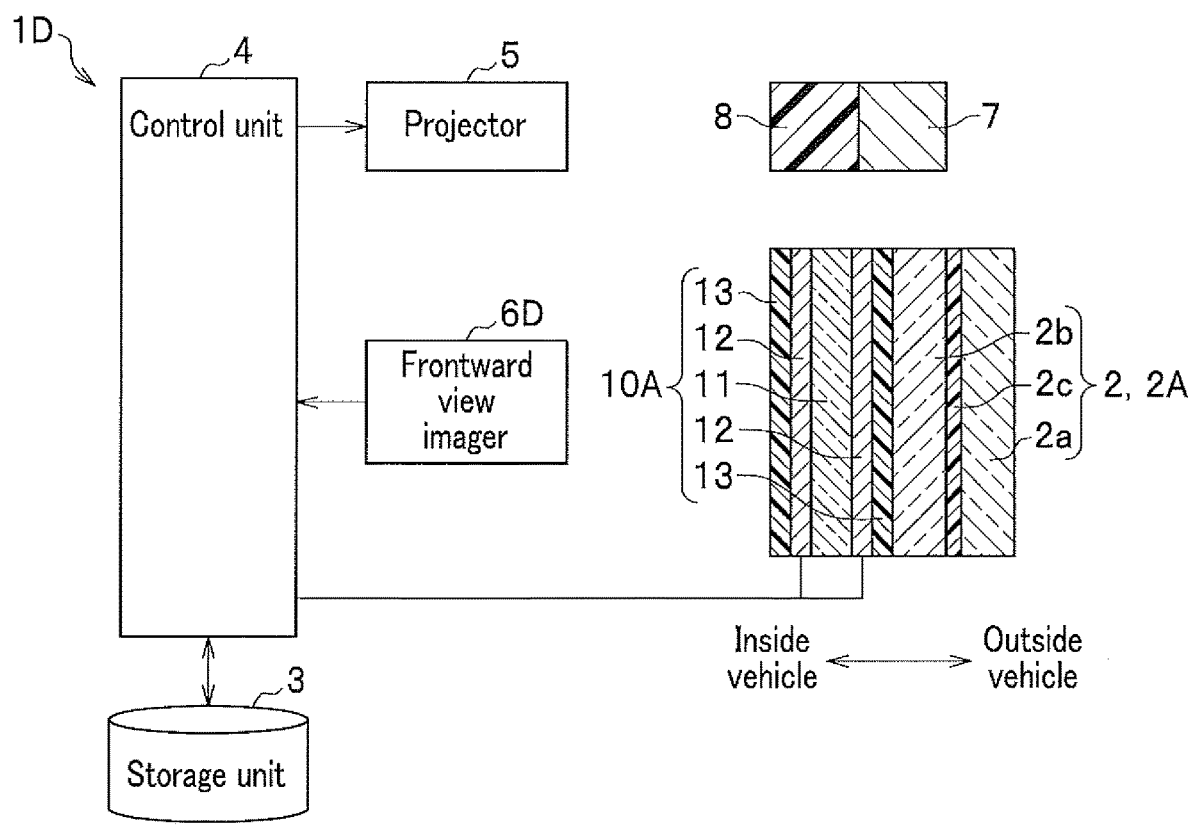
FIG. 5 is a block diagram schematically showing a vehicular display system according to a fourth embodiment of the present invention.

Next, a vehicular display system according to a fourth embodiment of the present invention will be described, focusing on differences from the vehicular display system 1A according to the first embodiment. As shown in FIG. 5, a vehicular display system 1D according to the fourth embodiment of the present invention includes a frontward view imager 6D that images frontward view of the vehicle and outputs an imaged result to the control unit 4.

<Exemplary Control Operation>

Figure 6:
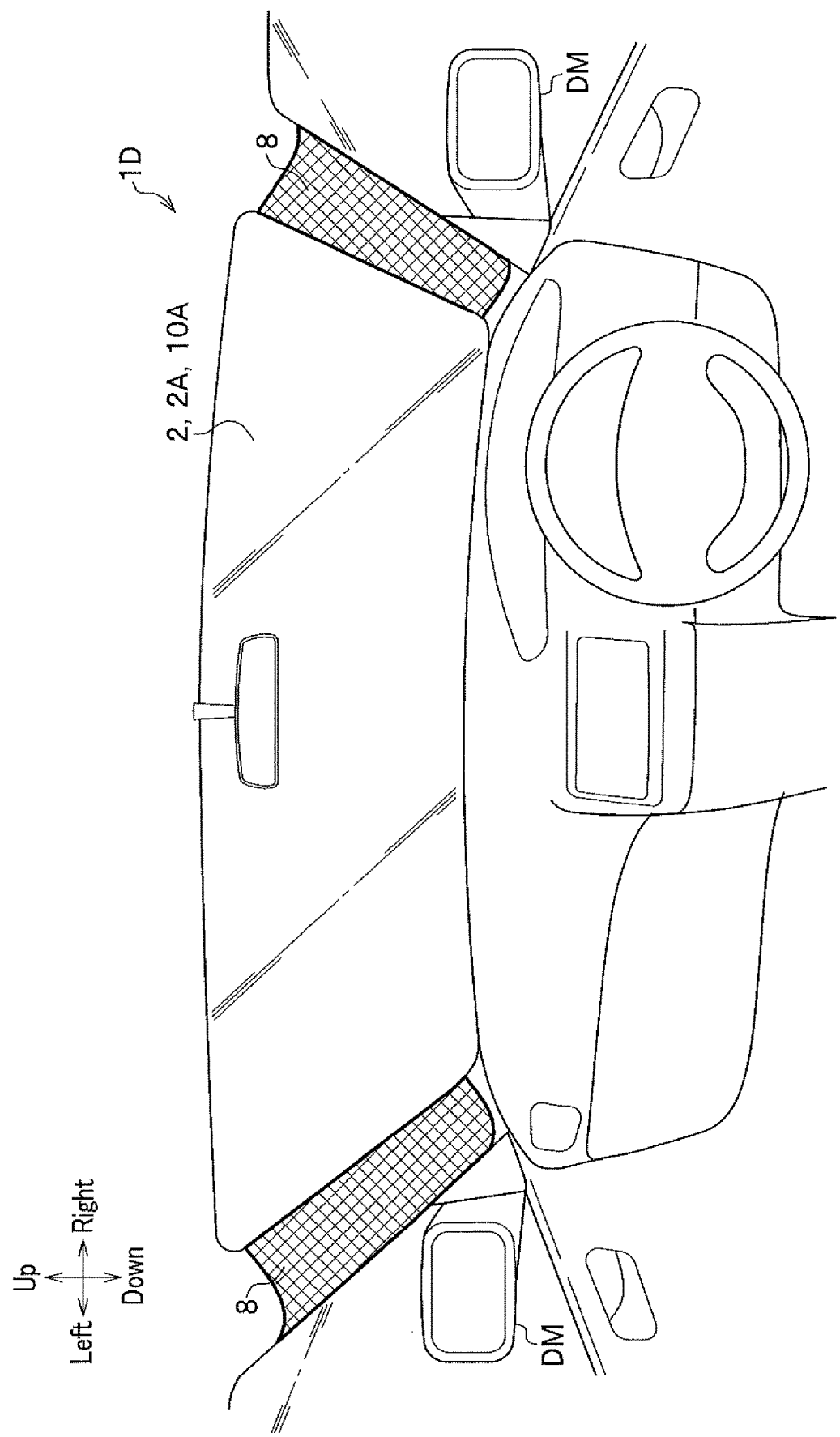
FIG. 6 is a diagram schematically showing display areas in a vehicular display system according to the fourth embodiment of the present invention.

The control unit 4 controls the projector 5 to project the imaged result by the frontward view imager 6D onto an interior member 8 of a front pillar 7. The front pillar 7 is a skeleton member made of metal or the like that extends vertically at both ends in the vehicle width direction of the front window 2. The lower end of the front pillar 7 is connected to a body panel constituting a side wall in the vehicle width direction of the vehicle, while the upper end of the front pillar 7 is connected to a roof panel 41 (see FIG. 11) that constitutes a ceiling of the vehicle. Here, the control unit 4 converts the imaged result by the frontward view imager 6D into that having such as the same angle of view as the view to be seen by the driver through the front pillar 7 if the front pillar 7 were transparent, so as to be displayed on the interior member 8 (see FIG. 6). Such control is applicable to the interior members 8 of the pair of right and left front pillars 7. The interior member 8 of the front pillar 7 desirably has a color on which images or videos are suitably displayed (white or the like).

The vehicular display system 1D according to the fourth embodiment of the present invention includes a frontward view imager 6D that images frontward view of the vehicle, and the control unit 4 controls the projector 5 to cause the imaged result by the frontward view imager 6D to be displayed on the interior member 8 provided on a surface of the front pillar 7 which faces the vehicle compartment. Then, the vehicular display system 1D is capable of eliminating blind spots for the driver by the front pillars 7.

Fifth Embodiment

Figure 7:
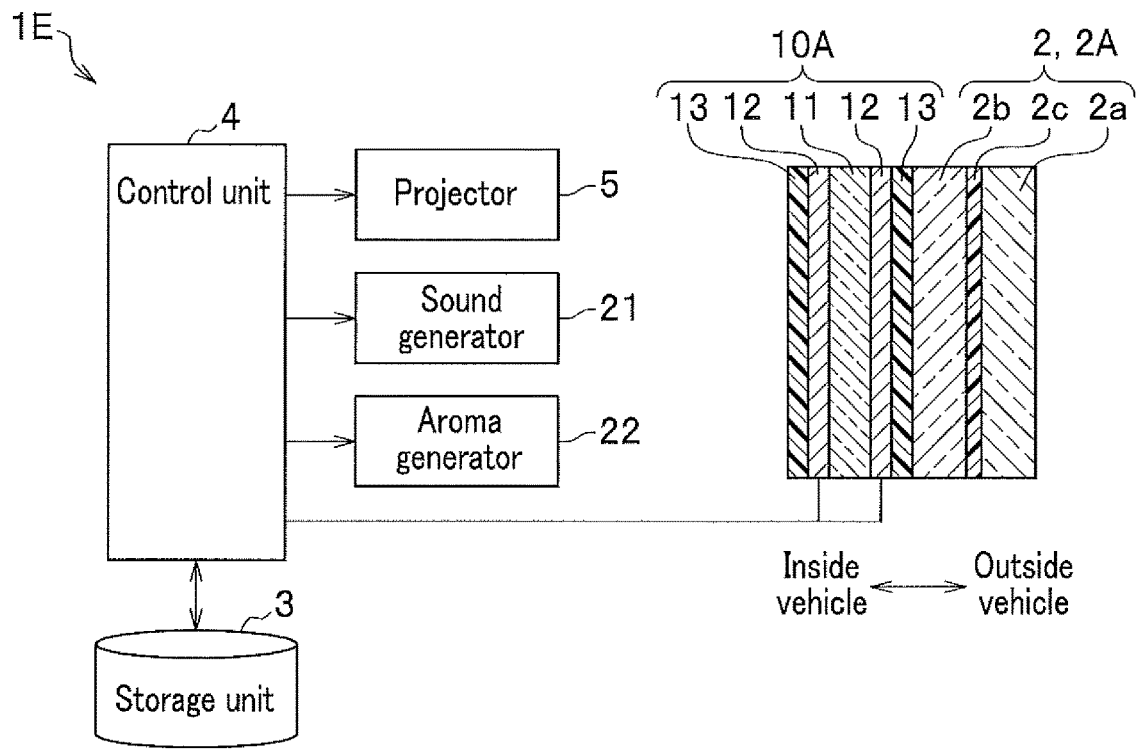
FIG. 7 is a block diagram schematically showing a vehicular display system according to a fifth embodiment of the present invention.

Next, a vehicular display system according to a fifth embodiment of the present invention will be described, focusing on differences from the vehicular display system 1A according to the first embodiment. As shown in FIG. 7, a vehicular display system 1E according to the fifth embodiment of the present invention includes at least one of a sound generator 21 and an aroma generator 22, and both are included in the present embodiment.

<Voice Generator and Aroma Generator>

The sound generator 21 is a speaker that generates sound toward the outside of the vehicle. The aroma generator 22 is a device that generates aroma toward the outside of the vehicle. The sound generator 21 and the aroma generator 22 are appropriately installable at a desired part of the vehicle body.

<Exemplary Control Operation>

The control unit 4 turns off energizing the liquid crystal unit 10A in the case of providing a function of allowing people outside the vehicle to view images or videos. Then, the control unit 4 causes the projector 5 to display images or videos onto the liquid crystal unit 10A which is now white translucent, or gray translucent. In addition, the control unit 4 controls the sound generator 21 to generate sound linked to the displayed images or videos toward people outside the vehicle, or controls the aroma generator 22 to generated aroma linked to the displayed images or videos toward people outside the vehicle.

In the vehicular display system 1E according to the fifth embodiment of the present invention, the control unit 4 controls the liquid crystal unit 10A and the projector 5 to display images or videos for people outside of the vehicle. Then, the vehicular display system 1E achieves both display performance of images or videos for people outside the vehicle and viewability as the window in a non-display mode.

The vehicular display system 1E according to the fifth embodiment of the present invention includes at least one of the sound generator 21 that generates sound for people outside the vehicle, and the aroma generator 22 that generates aroma for people outside the vehicle, and the control unit 4 controls at least one of the sound generator 21 and the aroma generator 22 in conjunction with images or videos. Then, the vehicular display system 1E is capable of providing more effective advertisement, entertainment, and the like to people outside the vehicle.

Sixth Embodiment

Figure 8:
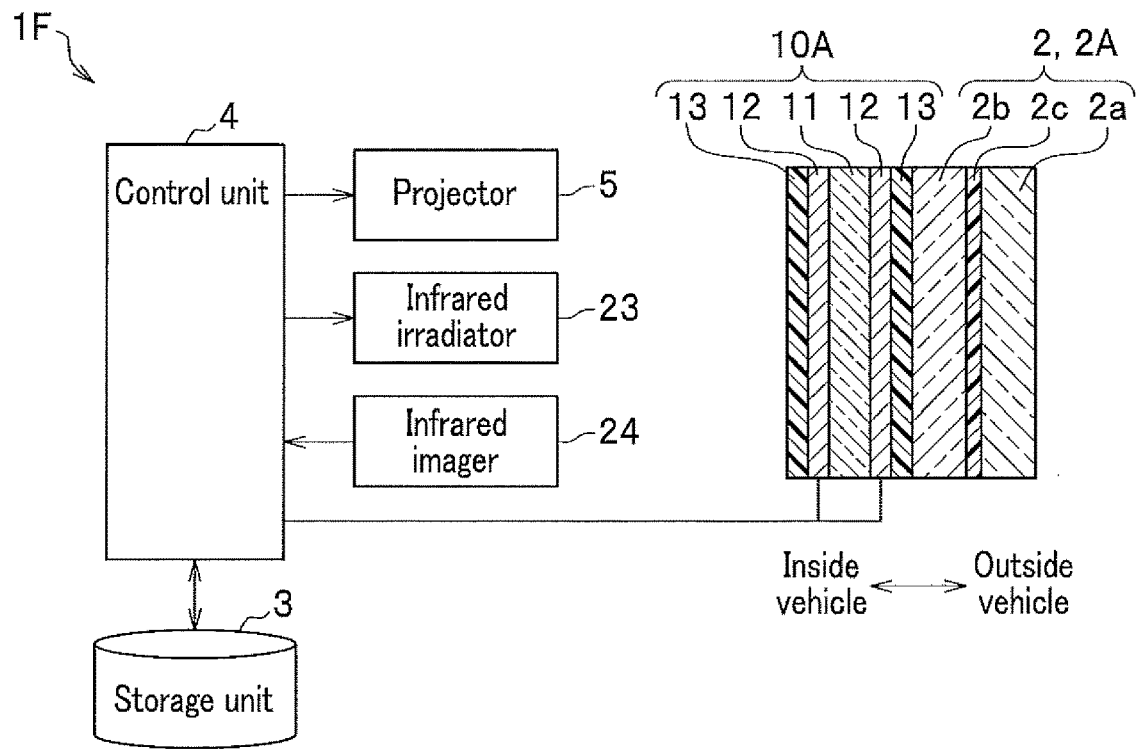
FIG. 8 is a block diagram schematically showing a vehicular display system according to a sixth embodiment of the present invention.

Next, a vehicular display system according to a sixth embodiment of the present invention will be described, focusing on differences from the vehicular display system 1A according to the first embodiment. As shown in FIG. 8, a vehicular display system 1F according to the sixth embodiment of the present invention includes an infrared irradiator 23 and an infrared imager 24.

<Infrared Irradiator and Infrared Imager as Example of Position Detector>

The infrared irradiator 23 is integrated with the projector 5, and irradiates infrared rays toward the liquid crystal unit 10A. The infrared imager 24 is integrated with the projector 5, and is an infrared camera to image the liquid crystal unit 10A. The infrared ray irradiator 23 and the infrared imager 24 constitute an example of a position detector that detects a position on a surface of the liquid crystal unit 10A touched by a passenger.

<Exemplary Control Operation>

The control unit 4 controls the projector 5 based on the imaged result by the infrared imager 24 to project an image or a video, corresponding to the position on the surface of the liquid crystal unit 10A touched by a passenger of the vehicle, onto the liquid crystal unit 10A. That is, the control unit 4 causes the liquid crystal unit 10A to serve as a touch panel, to provide such as services by software for a tablet terminal to one or more passengers of the vehicle.

The vehicular display system 1F according to the sixth embodiment of the present invention includes a position detector that detects the position on the surface of the liquid crystal unit 10A touched by a passenger, and the control unit 4 controls the projector 5 based on the detection result by the position detector. Then, the vehicular display system 1F causes the liquid crystal unit 10A to serve as a touch panel.

Seventh Embodiment

Figure 9:
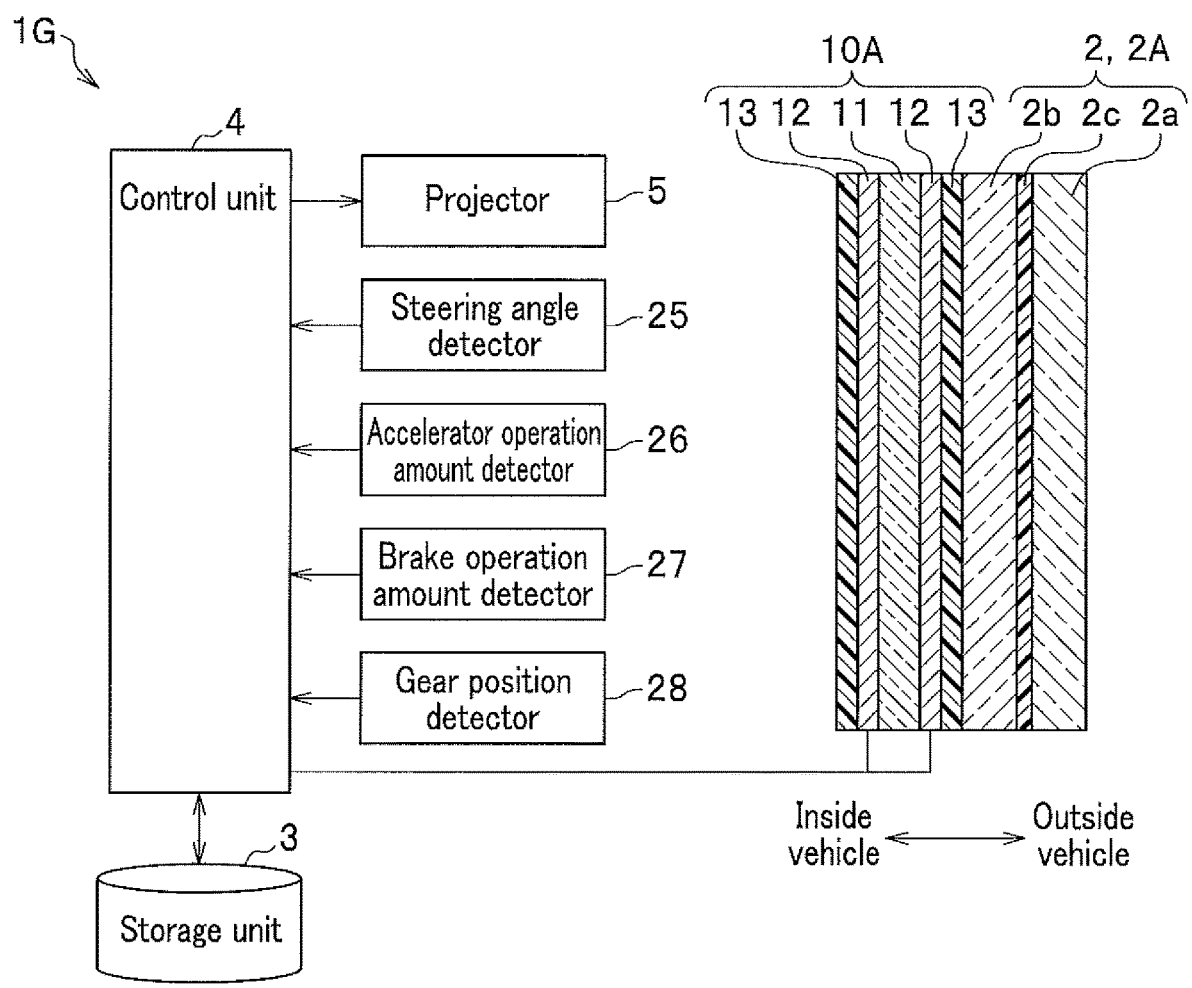
FIG. 9 is a block diagram schematically showing a vehicular display system according to a seventh embodiment of the present invention.

Next, a vehicular display system according to a seventh embodiment of the present invention will be described, focusing on differences from the vehicular display system 1A according to the first embodiment. As shown in FIG. 9, a vehicular display system 1G according to the seventh embodiment of the present invention includes at least one of a steering angle detector 25, an accelerator operation amount detector 26, a brake operation amount detector 27, and a gear position detector 28 (all are included in the present embodiment).

<Respective Detectors>

The steering angle detector 25 is a steering angle sensor that detects a steering angle of a steering wheel of the vehicle, and outputs the detection result to the control unit 4. The accelerator operation amount detector 26 is a sensor that detects an operation amount of an accelerator pedal of the vehicle, and outputs the detection result to the control unit 4. The brake operation amount detector 27 is a sensor that detects an operation amount of a brake pedal of the vehicle, and outputs the detection result to the control unit 4. The gear position detector 28 is a sensor that detects a gear position of a transmission of the vehicle, and outputs the detection result to the control unit 4.

<Exemplary Control Operation>

The control unit 4 sets the liquid crystal unit 10A white translucent or gray translucent in the parked vehicle, and then controls the projector 5 based on the detection results by the respective detectors 25 to 28 to project images or videos according to the detection results by the respective detectors 25 to 28 onto the liquid crystal unit 10A. That is, the control unit 4 is, for example, capable of applying a game application about a car (e.g., for driving, racing) to the actual vehicle and providing it to one or more passengers of the vehicle during a time waiting for charging in the case of the vehicle being an EV or the like. In the case of providing such a game application to one or more passengers of the vehicle, the liquid crystal units 10A are desirably provided in all the windows 2 described above, and a plurality of projectors 5 project images or videos linked to one another onto all the windows 2.

The vehicular display system 1G according to the seventh embodiment of the present invention includes at least one of the steering angle detector 25 that detects the steering angle of the steering wheel of the vehicle, the accelerator operation amount detector 26 that detects the operation amount of the accelerator pedal of the vehicle, the brake operation amount detector 27 that detects the operation amount of the brake pedal of the vehicle, and the gear position detector 28 that detects the gear position of the transmission of the vehicle, and the control unit 4 controls the projector 5 based on at least one detection result by the steering angle detector 25, the accelerator operation amount detector 26, the brake operation amount detector 27, and the gear position detector 28. Then, the vehicular display system 1G is capable of displaying images or videos according to the operation in the parked vehicle, for example.

<Structure of Rearview Mirror>

Figure 10:
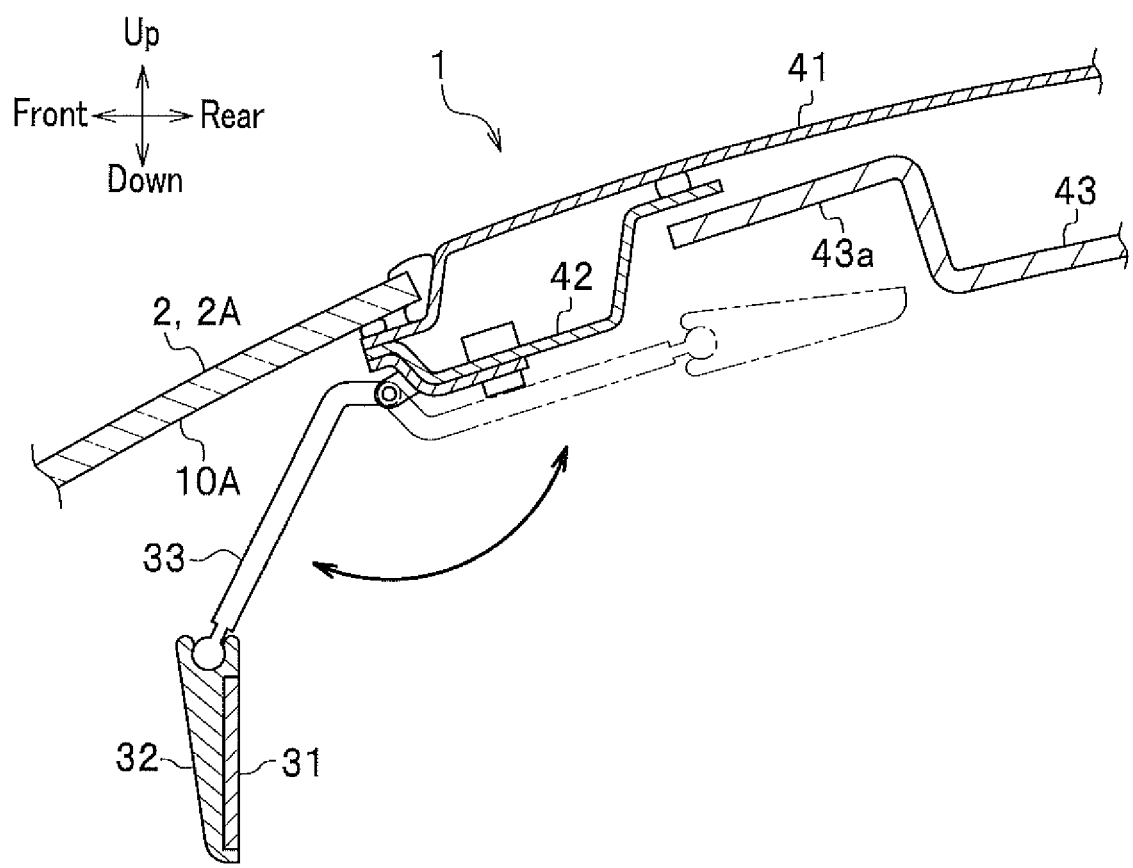
FIG. 10 is a cross-sectional view of a schematic structure of a rearview mirror to be used with an embodiment of the present invention.

A description will be given next of the structure of a rearview mirror in the case of the vehicular display system 1A or the like according to any of the embodiments of the present invention being applied to the front window, with reference to FIG. 10. As shown in FIG. 10, a rearview mirror 30 is provided inside the vehicle, and includes a mirror 31, a mirror cover 32, and a stay 33.

The mirror cover 32 is a resin casing having a rear opening. The mirror 31 is accommodated in the rear opening of the mirror cover 32. The stay 33 is a resin member connecting the mirror cover 32 and an inner roof panel 42 provided below the front end of the roof panel 41. One end of the stay 33 is connected to the mirror cover 31 via a ball joint or the like. The other end of the stay 33 is connected to the inner roof panel 42 via a hinge or the like.

The mirror cover 32 of the rearview mirror 30 is automatically or manually pivoted rearward about the other end of the stay 33 as an axis so as to be housed in a recessed part 43a formed in a roof interior member 43 which is provided below the roof panel 41. In addition, map lamps are provided on the right and left sides of the stay 33 in an accommodated state, which will be turned on when one or more passengers of the vehicle read a map or the like.

The vehicular display systems according to the embodiments of the present invention each include a front window as the window 2 and a rearview mirror provided in the rear of the front window, and the rearview mirror can be housed so as to run along a ceiling surface of the vehicle (e.g., the roof interior member 43). Then, the vehicular display system 1A is capable of preventing the rearview mirror 30 from getting in the way when images or videos are displayed on the front window.

<Projector Arrangements>

Hereinbelow are setup cases of the projector 5 in the vehicular display system of the present invention.

<First Setup Case>

Figure 11:
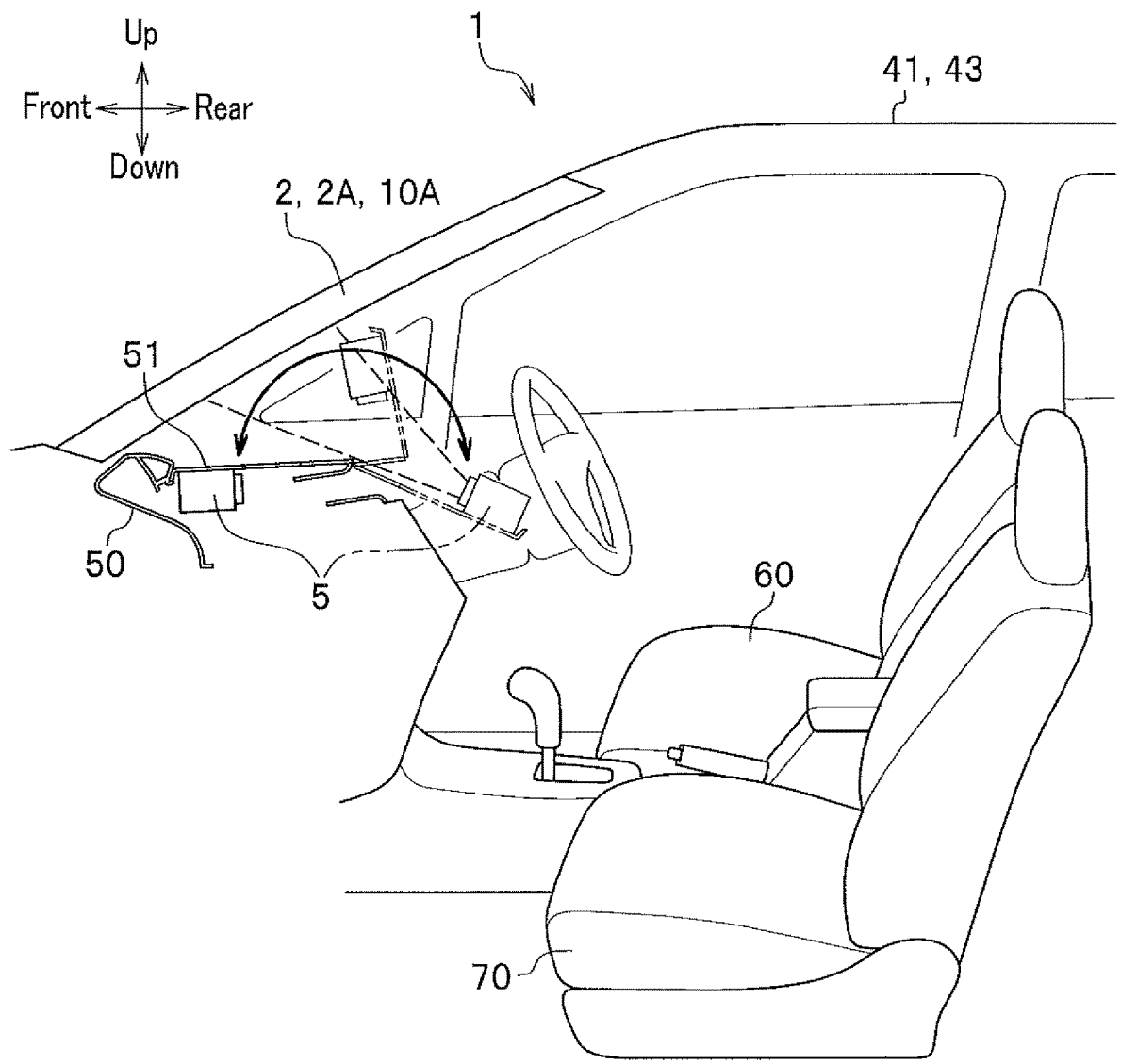
FIG. 11 is a diagram schematically showing a first setup case of a projector according to the embodiment of the present invention.

In a first setup case as shown in FIG. 11, the projector 5 is set up on a lid 51 of a dashboard 50. The base end (rear end when stored) of the lid 51 is connected to the main body of the dashboard 50 via a hinge or the like, and the projector 5 is attached to one surface (lower surface when stored) of the lid 51. When the projector 5 is to be used, a passenger of the vehicle pivots the lid 51 backward so as to be opened, to make the projector 5 ready to project images or videos onto the liquid crystal unit 10A provided in the front window 2.

<Second Setup Case>

Figure 12:
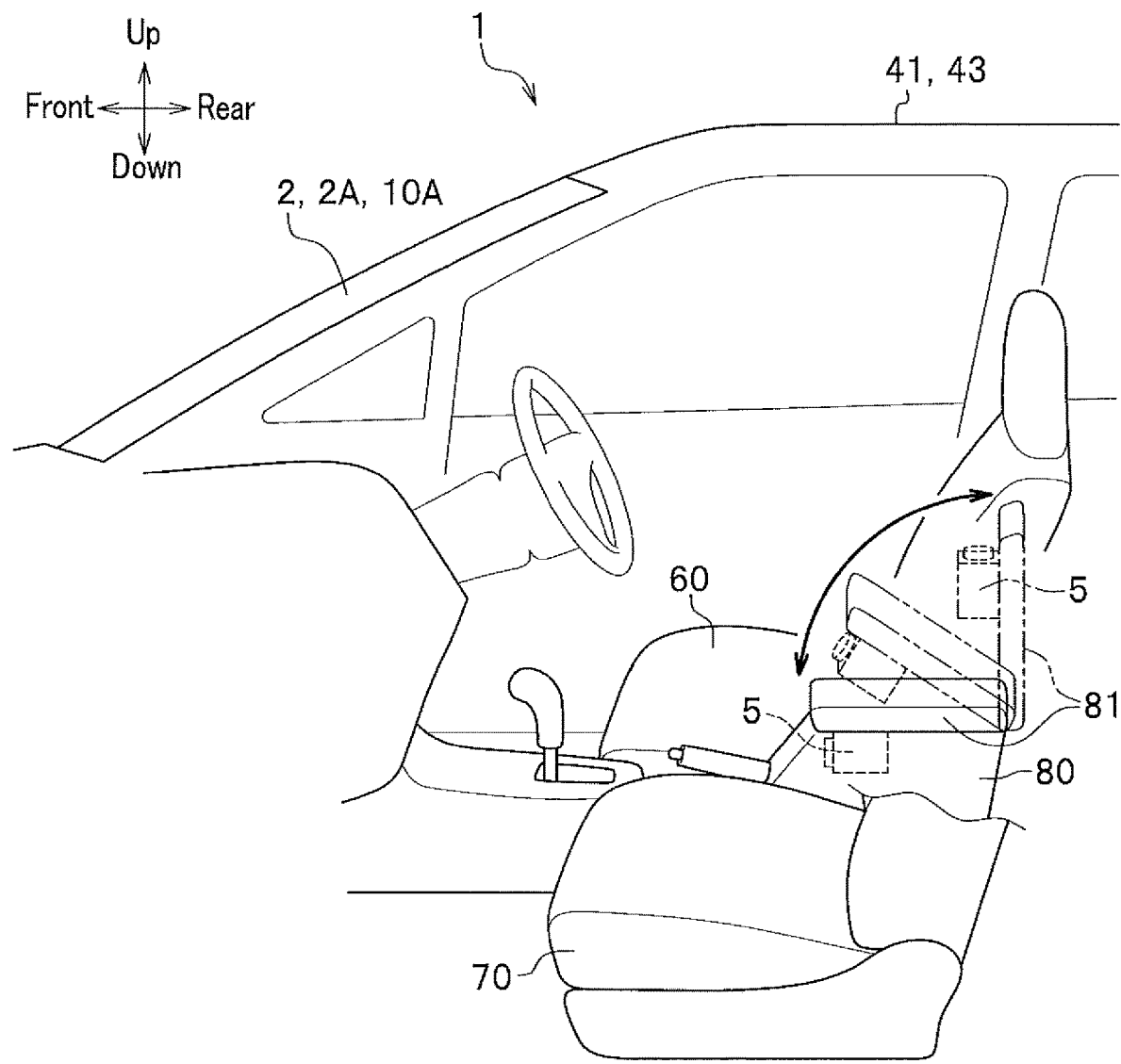
FIG. 12 is a diagram schematically showing a second setup case of the projector according to the embodiment of the present invention.

In a second setup case as shown in FIG. 12, the projector 5 is set up on a lid 81 of a storage box 80 provided between a driver's seat 60 and a front passenger seat 70. The base end (rear end when stored) of the lid 81 is connected to the main body of the storage box 80 via a hinge or the like, and the projector 5 is attached to one surface (the lower surface when stored) of the lid 81. When the projector 5 is to be used, a passenger of the vehicle pivots the lid 81 backward so as to be opened, to make the projector 5 ready to project images or videos onto the liquid crystal unit 10A provided in the front window 2, the liquid crystal unit provided in the roof window, or the inner roof interior member 43 provided below the roof (roof panel) 41. Note that the roof interior member 43 is desirably in a color of having images or videos readily displayed (white or the like).

<Third Setup Case>

Figure 13:
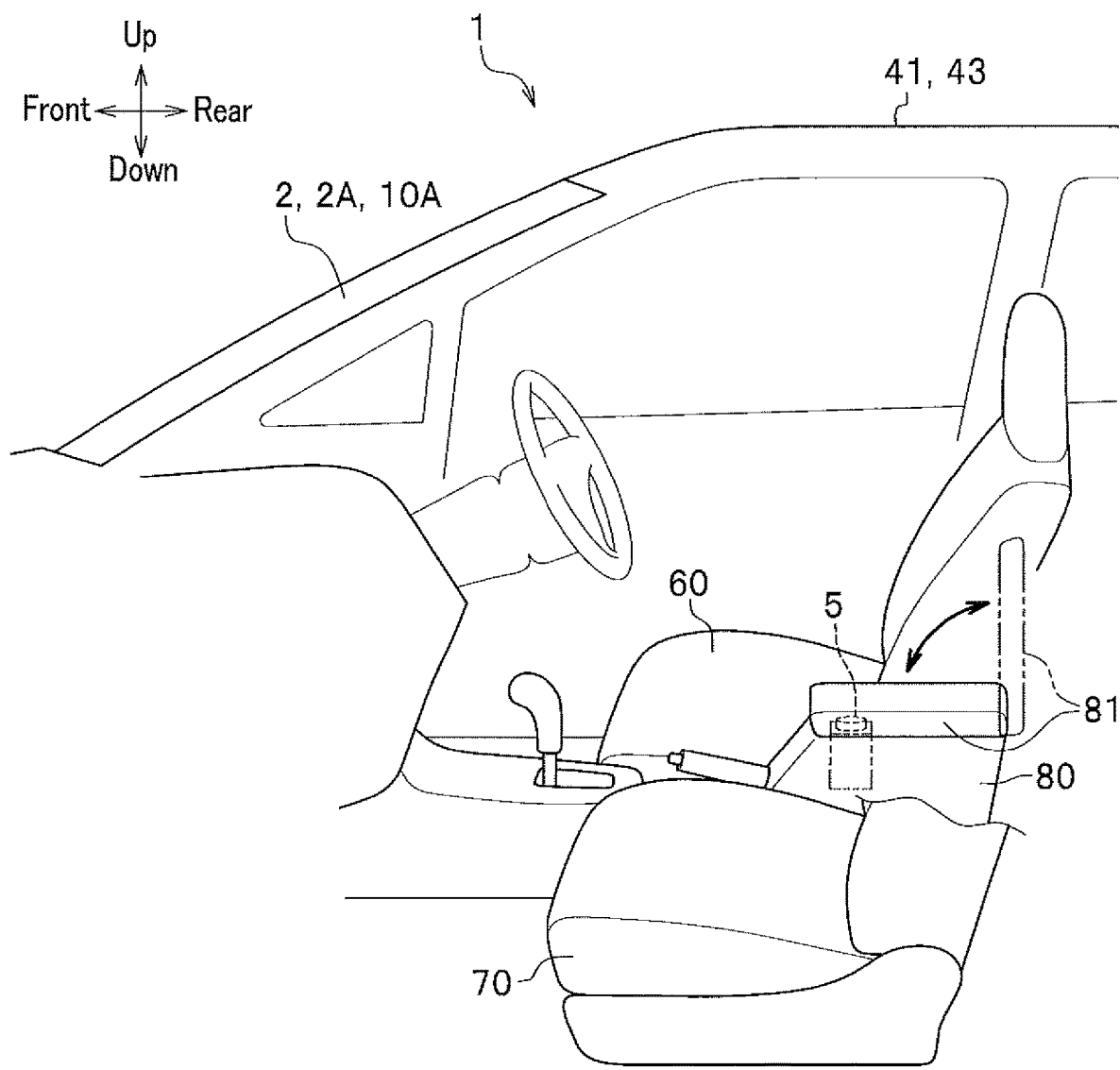
FIG. 13 is a diagram schematically showing a third setup case of the projector according to the embodiment of the present invention.

In a third setup case as shown in FIG. 13, the projector 5 is set up in the storage box 80 so as to face upward. When the projector 5 is to be used, a passenger of the vehicle pivots the lid 81 rearward so as to be opened, to make the projector 5 ready to project image or videos onto the liquid crystal unit provided in the roof window or the roof interior member 43 provided below the roof (roof panel) 41.

<Fourth Setup Case>

Figure 14:
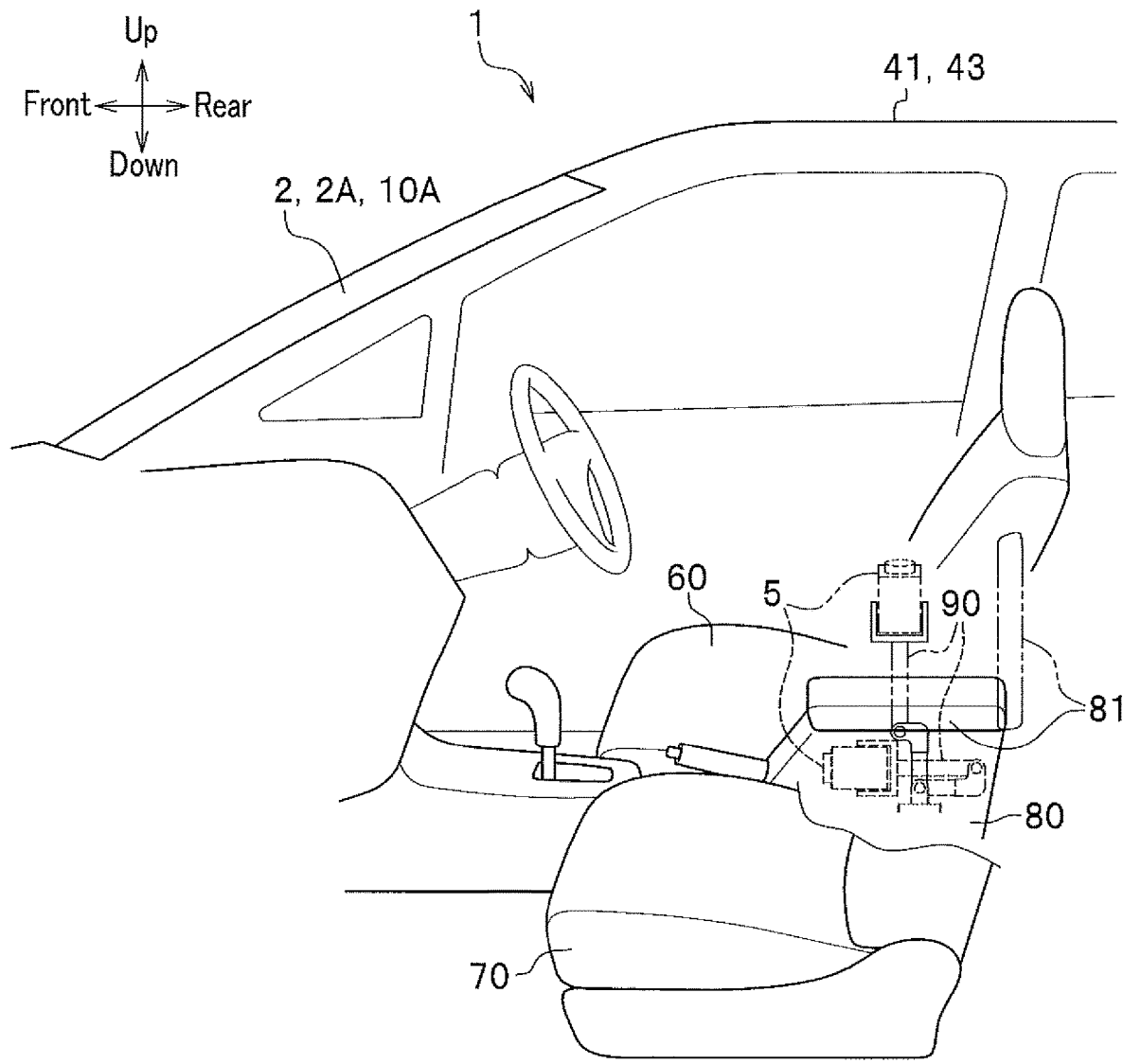
FIG. 14 is a diagram schematically showing a fourth setup case of the projector according to the embodiment of the present invention.

In a fourth setup case as shown in FIG. 14, the projector 5 is set up in the storage box 80 via an arm 90 that can change the orientation of the projector 5. When the projector 5 is to be used, a passenger of the vehicle pivots the lid 81 rearward so as to be opened, and operates the arm 90 to make the projector 5 ready to project images or videos onto the various windows 2 as described above or the interior members of the vehicle.

<Fifth Setup Case>

Figure 15:
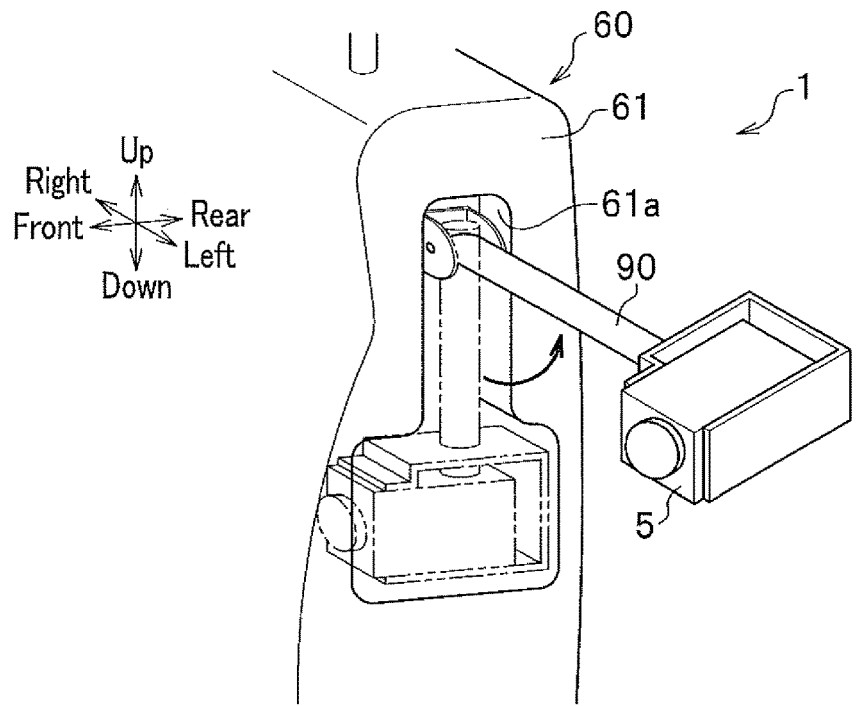
FIG. 15 is a diagram schematically showing a fifth setup case of the projector according to the embodiment of the present invention.

In a fifth setup case as shown in FIG. 15, the projector 5 is set up in a recess 61a formed on a side face of a seat back 61 of the driver's seat 60 via the arm 90. When the projector 5 is to be used, a passenger of the vehicle operates the arm 90 to deploy the projector 5 from the recess 61a and vertically adjusts the angle of the projector 5, to make the projector 5 ready to project images or videos onto the liquid crystal unit 10A provided in the front window 2, the liquid crystal unit provided in the roof window, the liquid crystal unit provided in the rear window, or the roof interior member 43 provided below the roof (roof panel) 41.

<Sixth Setup Case>

Figure 16:
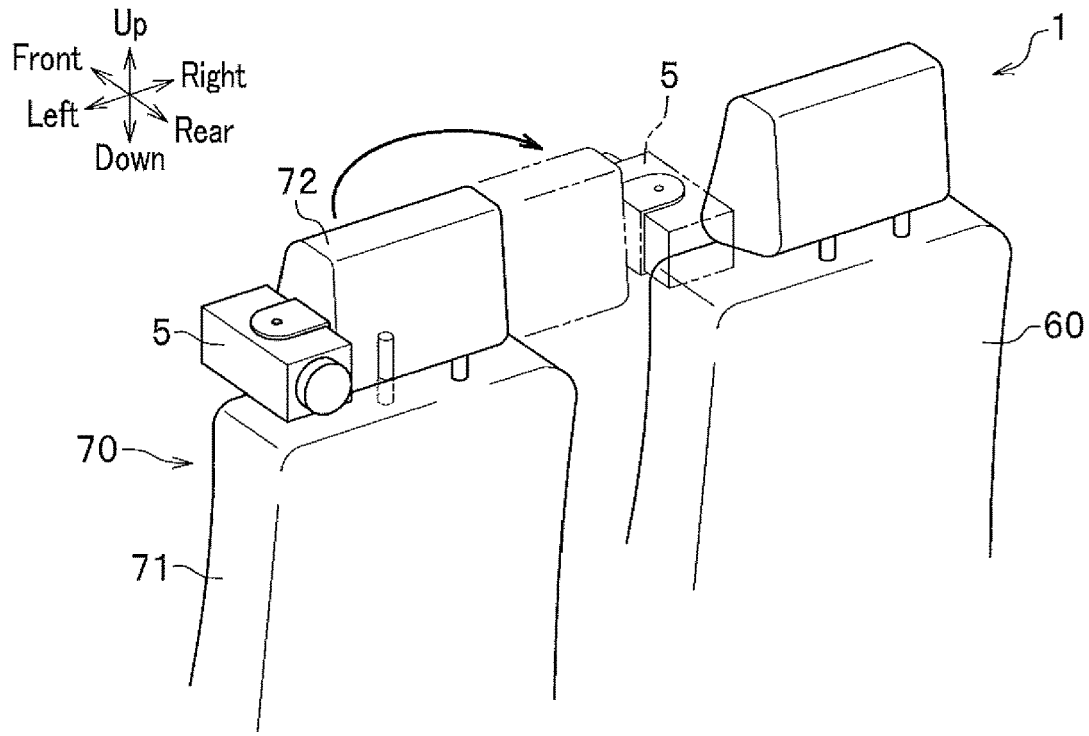
FIG. 16 is a diagram schematically showing a sixth setup case of the projector according to the embodiment of the present invention.

In a sixth setup case as shown in FIG. 16, the projector 5 is set up on the outer side in the vehicle width direction of a headrest 72 of the front passenger seat 70. When the projector 5 is to be used, a passenger of the vehicle rotates the headrest 72 around the vertical axis with respect to a seat back 71 and vertically as well as horizontally adjusts the angle of the projector 5, to make the projector 5 ready to project images or videos onto the liquid crystal unit 10A provided in the front window 2, the liquid crystal unit provided in the roof window, or the roof interior member 43 provided below the roof (roof panel) 41.

<Seventh Setup Case>

Figure 17:
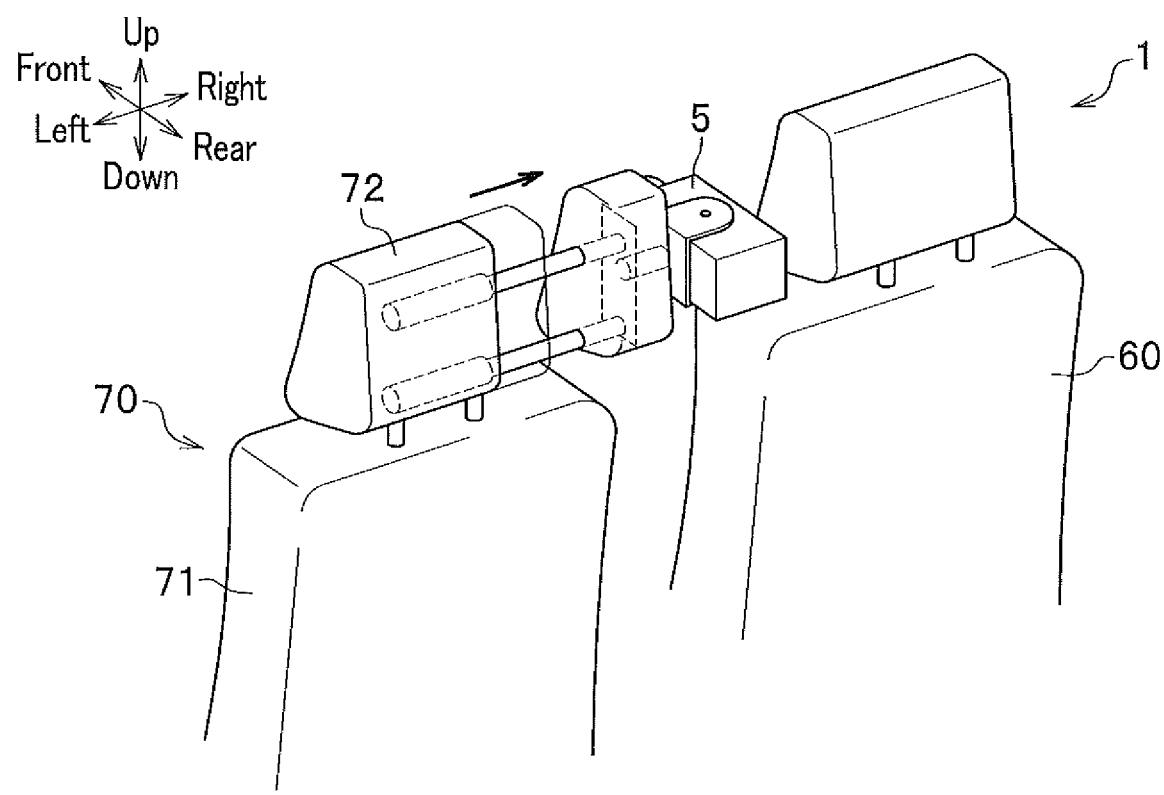
FIG. 17 is a diagram schematically showing a seventh setup case of the projector according to the embodiment of the present invention.

In a seventh setup case as shown in FIG. 17, the projector 5 is set up on the inner side in the vehicle width direction of the headrest 72 of the front passenger seat 70. When the projector 5 is to be used, a passenger of the vehicle withdraws the inner part in the vehicle width direction of the headrest 72 inward in the vehicle width direction and vertically as well as horizontally adjusts the angle of the projector 5, to make the projector 5 ready to project images or videos onto the liquid crystal unit 10A provided in the front window 2, the liquid crystal unit provided in the roof window, or the roof interior member 43 provided below the roof (roof panel) 41.

<Eighth Setup Case>

Figure 18:
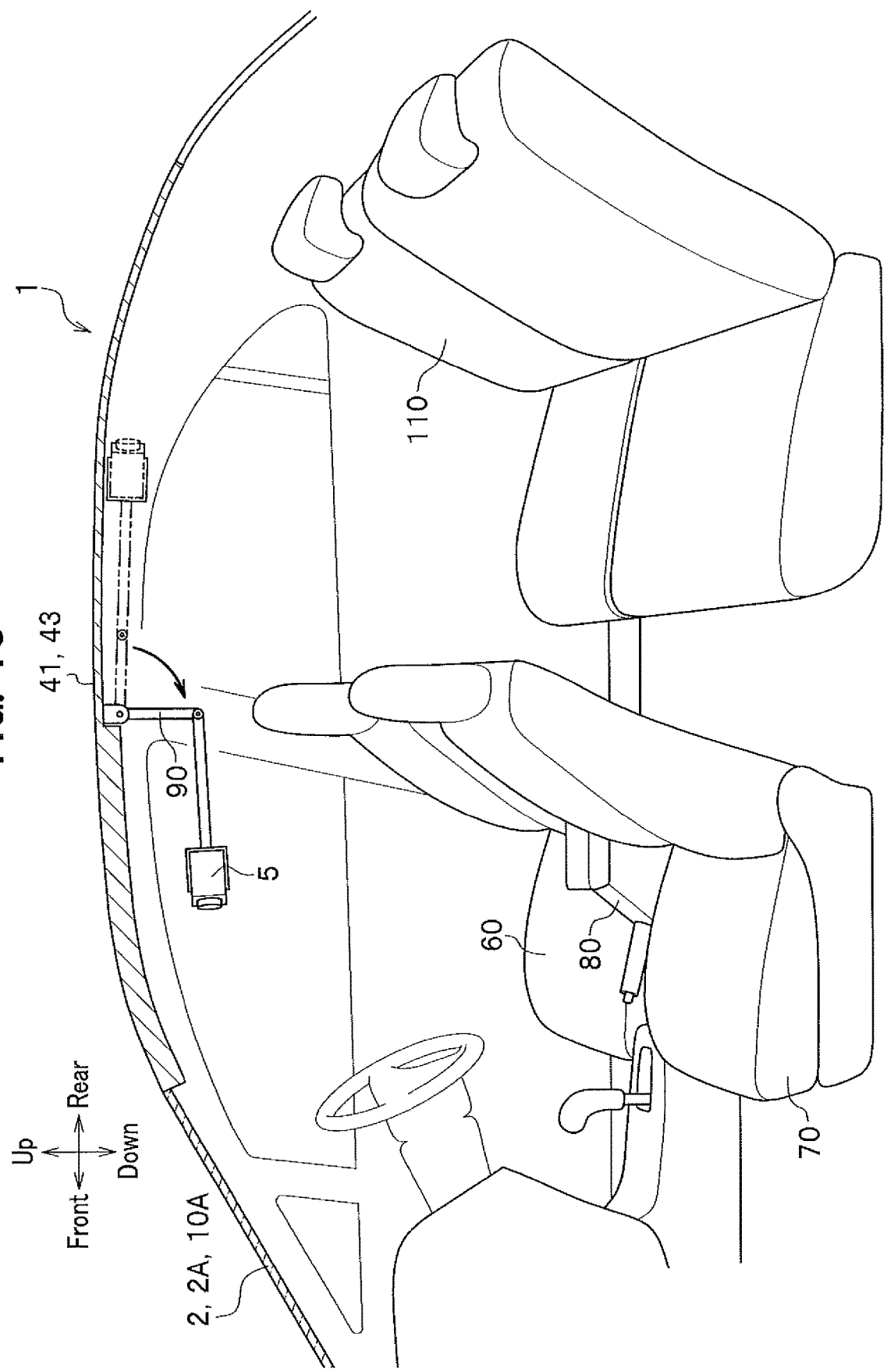
FIG. 18 is a view schematically showing an eighth setup case of the projector according to the embodiment of the present invention.

In an eighth setup case as shown in FIG. 18, the projector 5 is set up at the center portion of the roof interior member 43 provided below the roof (roof panel) 41 via the arm 90. When the projector 5 is stored, the projector 5 and the arm 90 are accommodated in a recess formed in the roof interior member 43. When the projector 5 is to be used, a passenger of the vehicle operates the arm 90 to deploy the projector 5 from the recess and adjusts the angle of the projector 5 so as to face horizontally any desired direction, to make the projector 5 ready to project images or videos onto all the windows 2, or the interior members of the pillars of the vehicle (especially, the interior member 8 of the front pillar 7 (see FIG. 6)).

<Ninth Setup Case>

Figure 19:
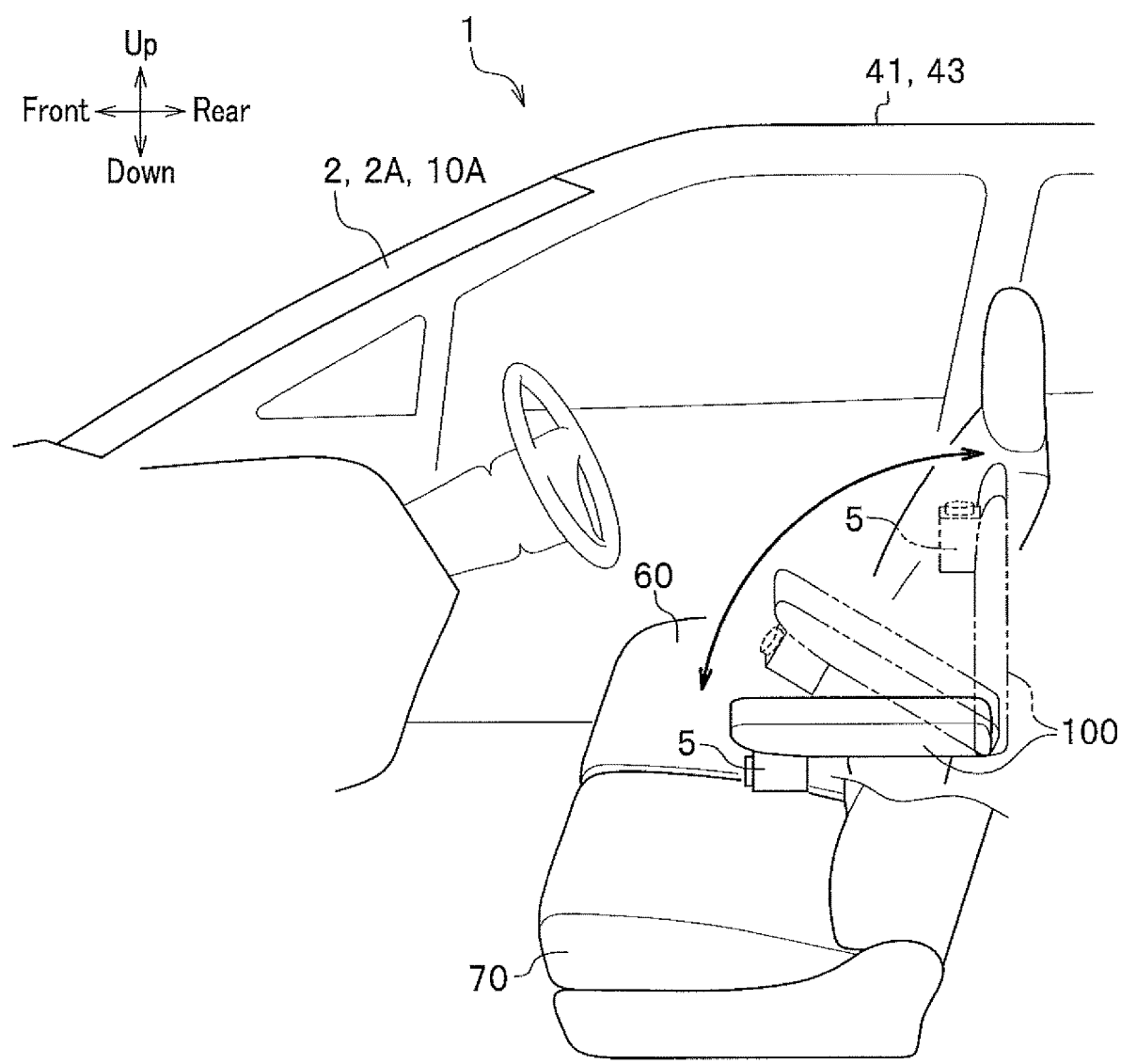
FIG. 19 is a diagram schematically showing a ninth setup case of the projector according to the embodiment of the present invention.

In a ninth setup case as shown in FIG. 19, the projector 5 is set up on an armrest 100 provided between the driver's seat 60 and the front passenger seat 70. The base end (rear end when stored) of the armrest 100 is connected to another member of the vehicle via a hinge or the like, and the projector 5 is mounted on one surface (lower surface when stored) of the armrest 100. When the projector 5 is to be used, a passenger of the vehicle pivots the armrest 100 backward so as to be opened, to make the projector 5 ready to project images or videos onto the liquid crystal unit 10A provided in the front window 2, the liquid crystal unit provided in the roof window, or the roof interior member 43 provided below the roof (roof panel) 41.

<Tenth Setup Case>

Figure 20:
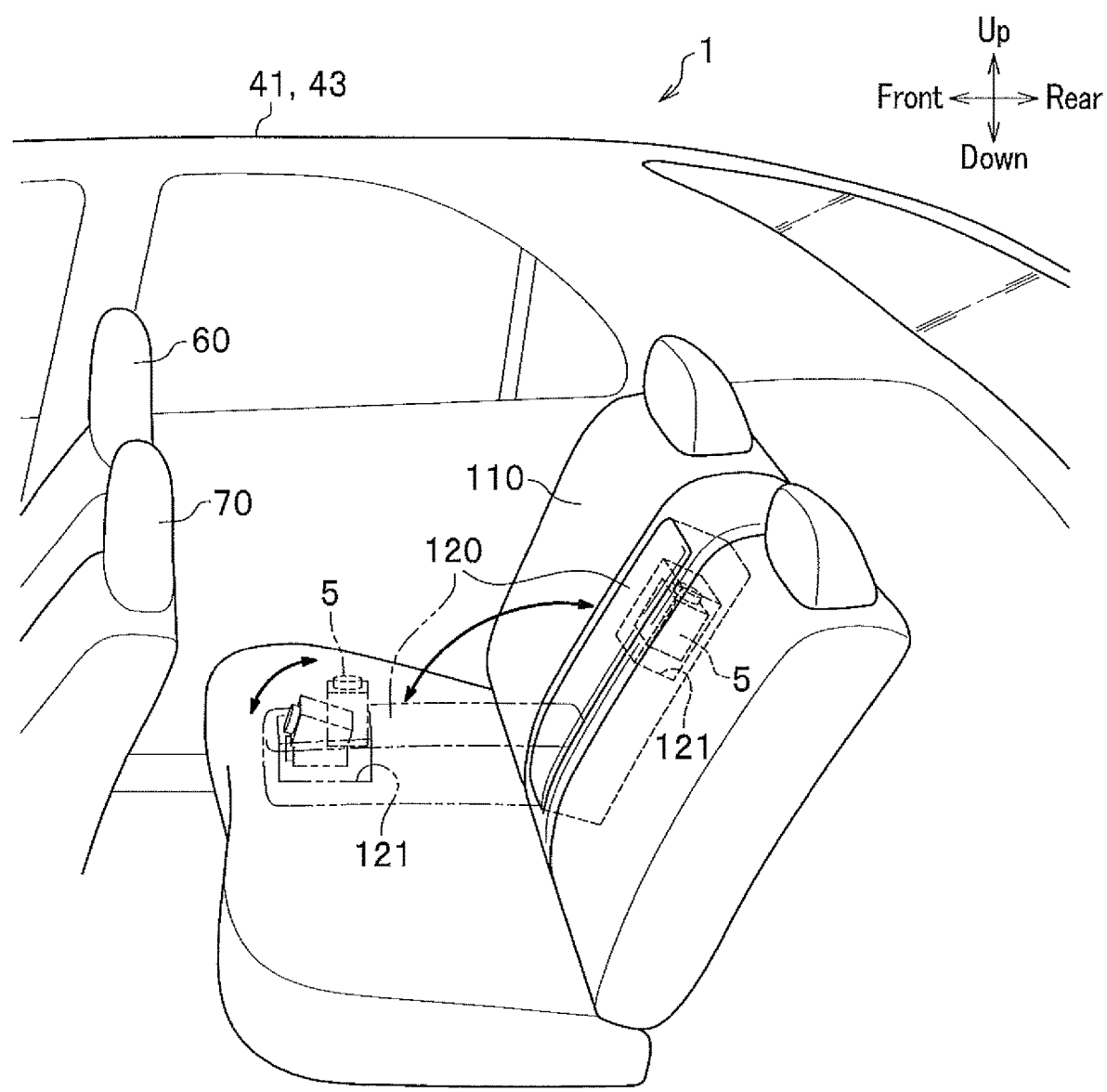
FIG. 20 is a view schematically showing a tenth setup case of the projector according to the embodiment of the present invention.

In a tenth setup case as shown in FIG. 20, the projector 5 is set up on an armrest 120 provided in a rear seat 110. The base end (lower end when stored) of the armrest 120 is connected to another member of the vehicle via a hinge or the like, and the projector 5 is mounted in a recess 121 formed in the one surface (rear surface when stored) of the armrest 120. When the projector 5 is to be used, a passenger of the vehicle pivots the armrest 120 forward so as to be opened and vertically adjusts the angle of the projector 5, to make the projector 5 ready to project images or videos onto the liquid crystal unit 10A provided in the front window 2, the liquid crystal unit provided in the roof window, or the roof interior member 43 provided below the roof (roof panel) 41.

<Eleventh Setup Case>

Figure 21:
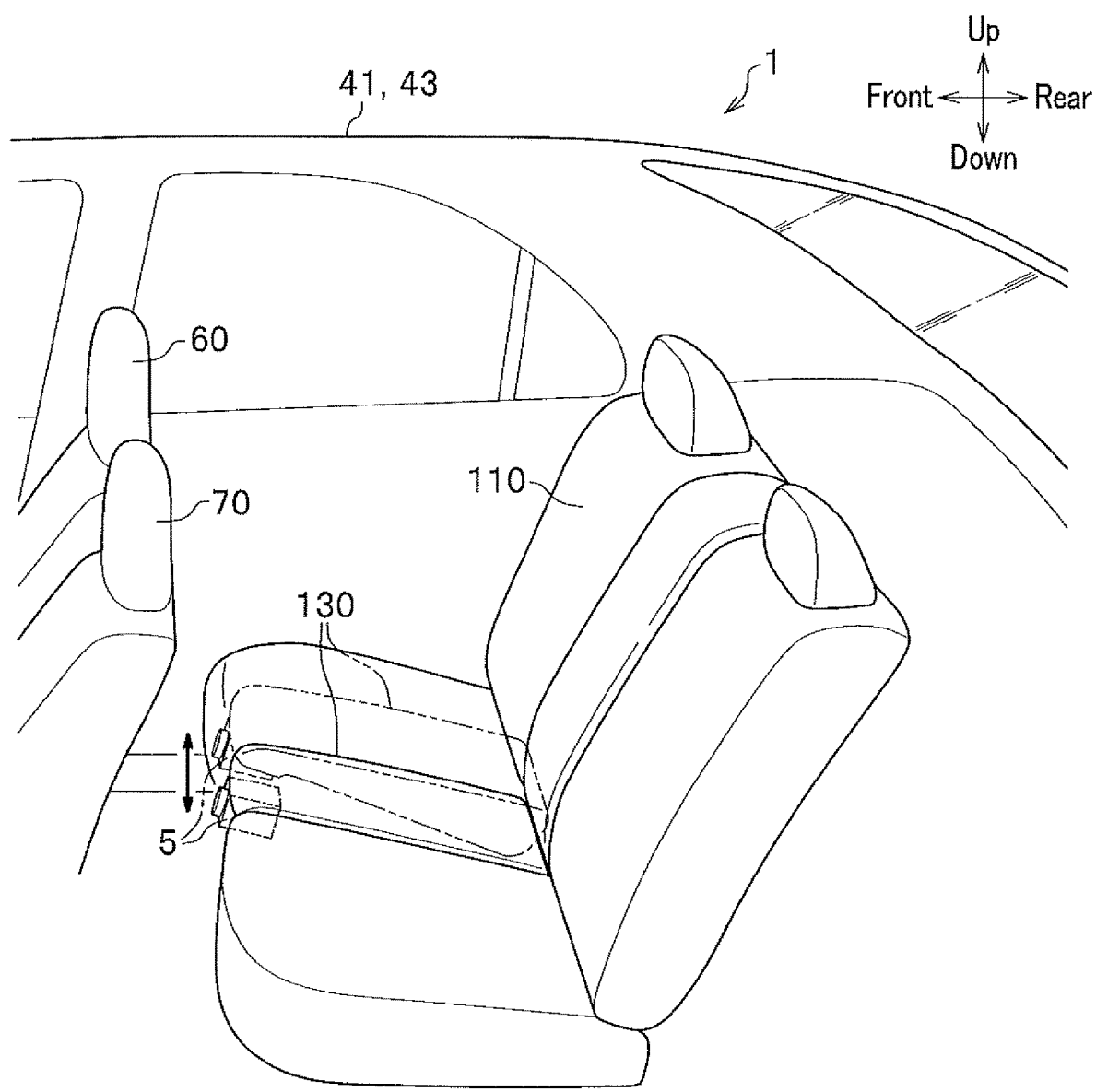
FIG. 21 is a diagram schematically showing an eleventh setup case of the projector according to the embodiment of the present invention.

In an eleventh setup case as shown in FIG. 21, the projector 5 is set up in an armrest 130 provided in the rear seat 110. The base end (rear end when stored) of the armrest 130 is connected slidably in the vertical direction to another member of the vehicle, and the projector 5 is mounted on one surface (lower surface) of the armrest 130. When the projector 5 is to be used, a passenger of the vehicle slides the armrest 130 upward and vertically adjusts the angle of the projector 5, to make the projector 5 ready to project images or videos onto the liquid crystal unit 10A provided in the front window 2.

<Twelfth Setup Case>

Figure 22:
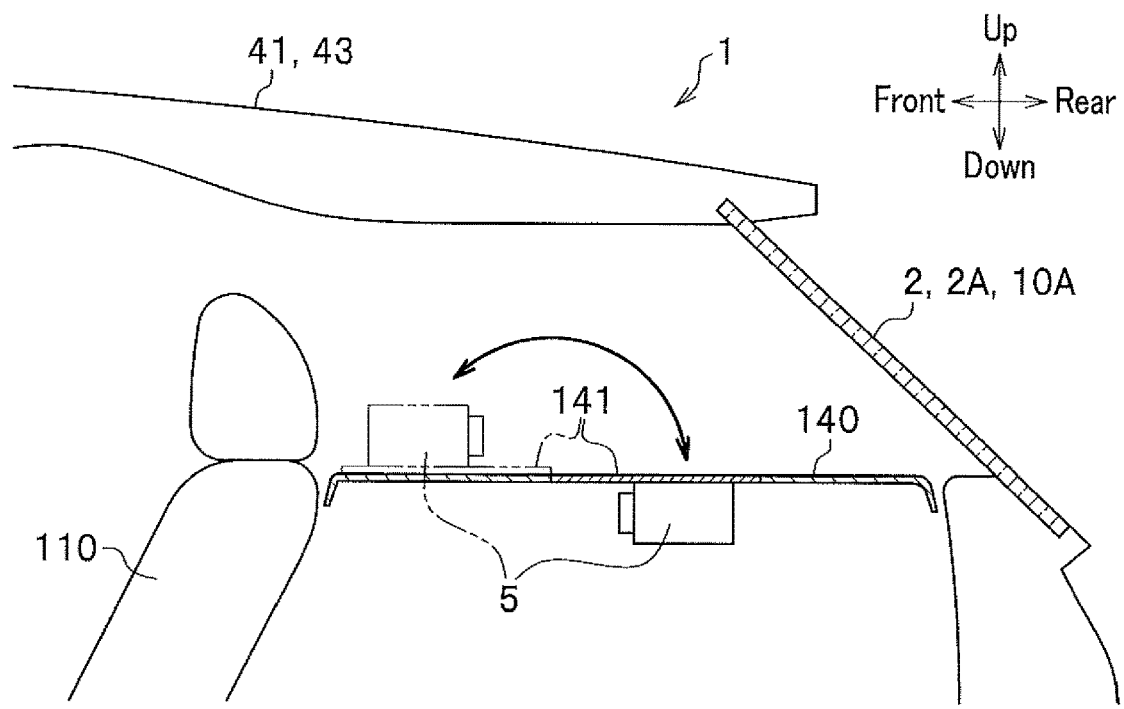
FIG. 22 is a diagram schematically showing a twelfth setup case of the projector according to the embodiment of the present invention.

In a twelfth setup case as shown in FIG. 22, the projector 5 is set up on a lid 141 of a parcel shelf 140 in back of the rear seat 110. The base end (front end when stored) of the lid 141 is connected to the main body of the parcel shelf 140 via a hinge or the like, and the projector 5 is mounted on one surface (lower surface when stored) of the lid 141 so as to face frontward. When the projector 5 is to be used, a passenger of the vehicle pivots the lid 141 frontward so as to be opened, to make the projector 5 ready to project images or videos onto the liquid crystal unit 10A provided in the rear window 2.

<Thirteenth Setup Case>

Figure 23:
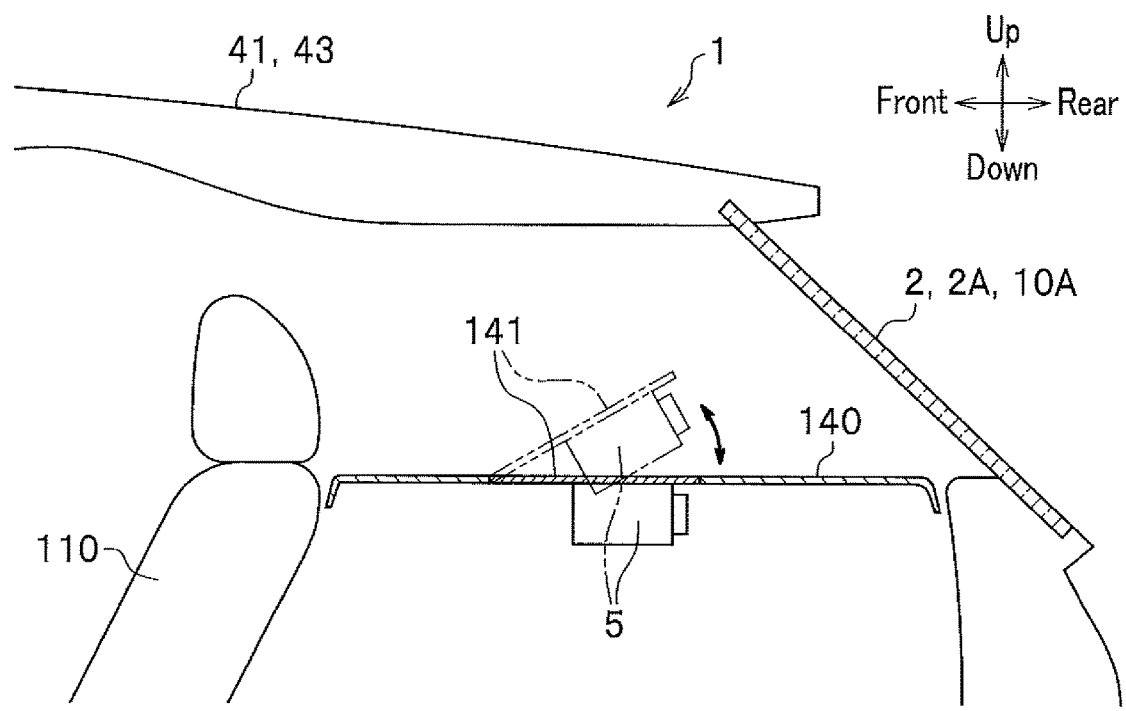
FIG. 23 is a diagram schematically showing a thirteenth setup case of the projector according to the embodiment of the present invention.

In a thirteenth setup case as shown in FIG. 23, the projector 5 is set up on the lid 141 of the parcel shelf 140 in back of the rear seat 110. The base end (front end when stored) of the lid 141 is connected to the main body of the parcel shelf 140 via a hinge or the like, and the projector 5 is mounted on one surface (lower surface when stored) of the lid 141 so as to face rearward. When the projector 5 is to be used, a passenger of the vehicle pivots the lid 141 frontward so as to be opened at an angle smaller than that in the twelfth setup case, to make the projector 5 ready to project images or videos on the liquid crystal unit 10A provided in the rear window 2.

<Fourteenth Setup Case>

Figure 24:
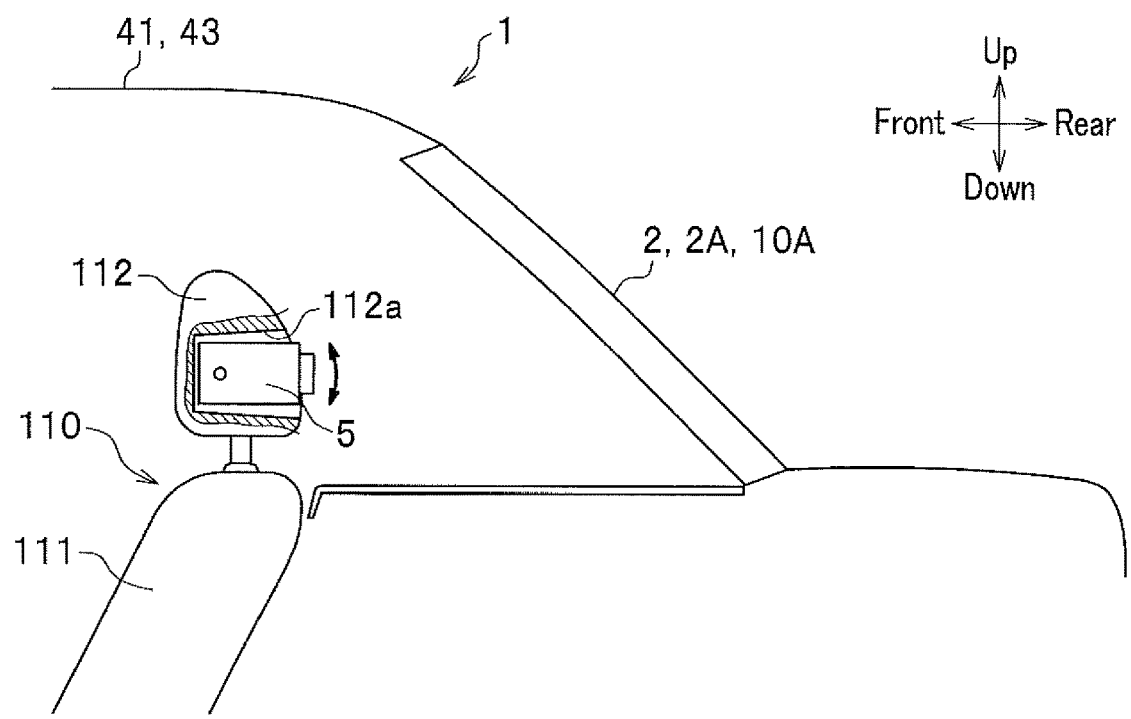
FIG. 24 is a diagram schematically showing a fourteenth setup case of the projector according to the embodiment of the present invention.

In a fourteenth setup case as shown in FIG. 24, the projector 5 is set up in a recess 112a formed in the rear surface of a headrest 112 of the rear seat 110. When the projector 5 is to be used, a passenger of the vehicle vertically as well as horizontally adjusts the angle of the projector 5 to make the projector 5 ready to project images or videos onto the liquid crystal unit 10A provided in the rear window 2.

<Fifteenth Setup Case>

Figure 25:
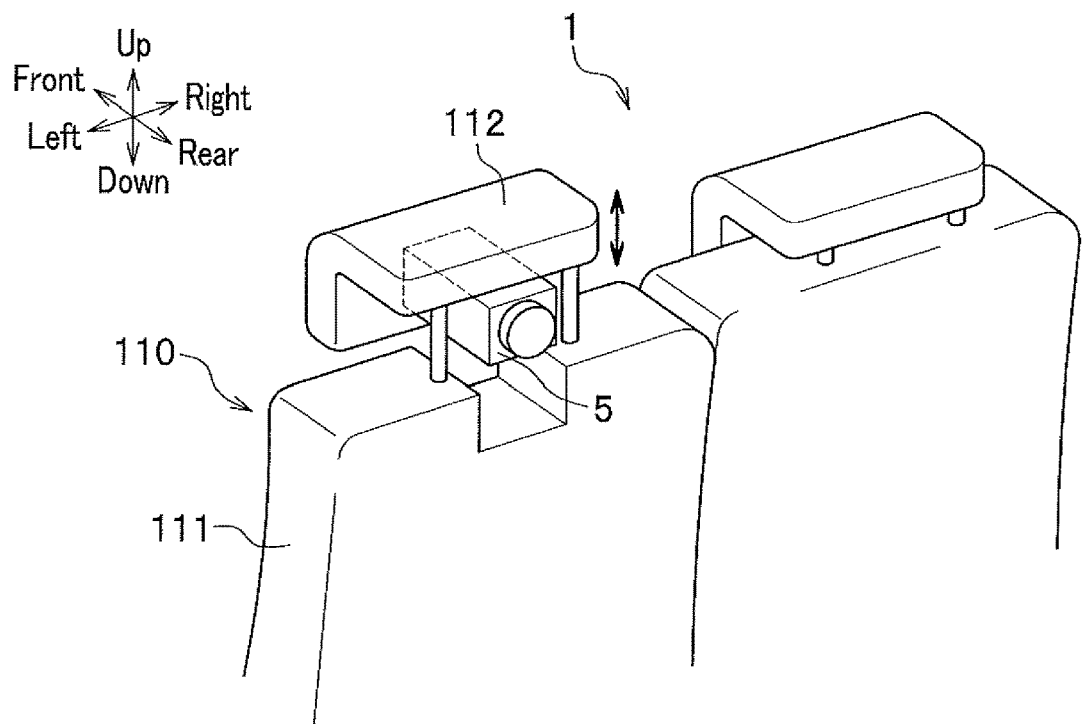
FIG. 25 is a diagram schematically showing a fifteenth setup case of the projector according to the embodiment of the present invention.

In a fifteenth setup case as shown in FIG. 25, the projector 5 is set up under the headrest 112 of the rear seat 110. When the projector 5 is to be used, a passenger of the vehicle moves the headrest 112 upward and downward with respect to a seat back 111, to make the projector 5 ready to project images or videos onto the liquid crystal unit 10A provided in the rear window 2.

<Sixteenth Setup Case>

Figure 26:
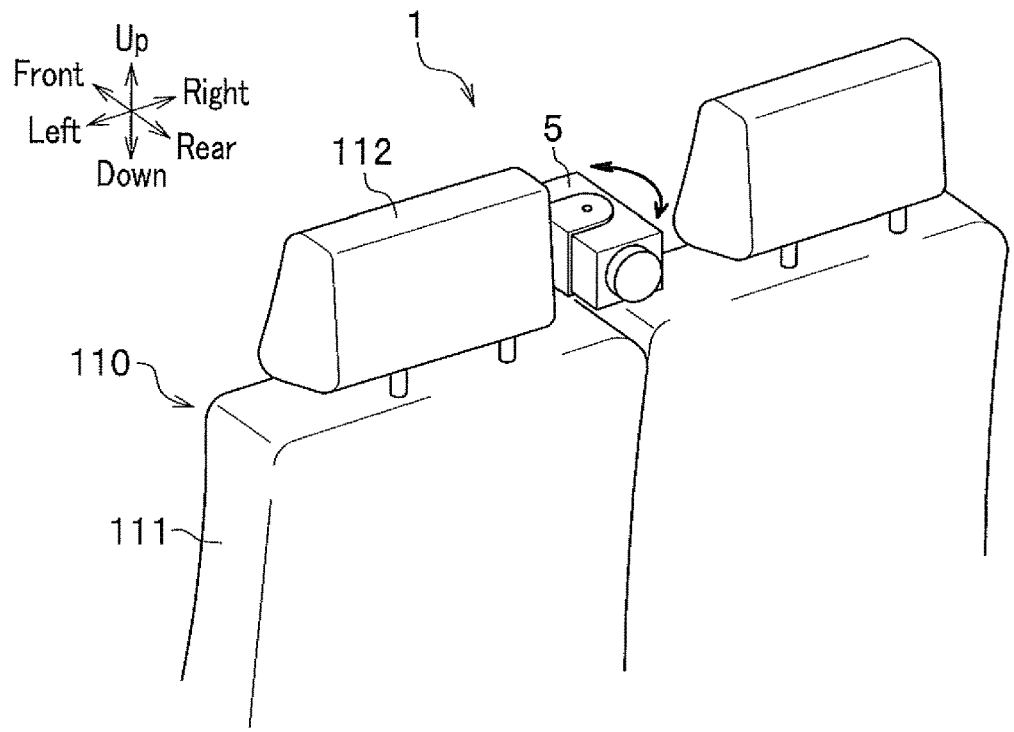
FIG. 26 is a diagram schematically showing a sixteenth setup case of the projector according to the embodiment of the present invention.

In a sixteenth setup case as shown in FIG. 26, the projector 5 is set up on the inner side in the vehicle width direction of the headrest 112 of the rear seat 110. When the projector 5 is to be used, a passenger of the vehicle vertically as well as horizontally adjusts the angle of the projector 5 to make the projector 5 ready to project images or videos onto the liquid crystal unit 10A provided in the rear window 2.

<Seventeenth Setup Case>

Figure 27:
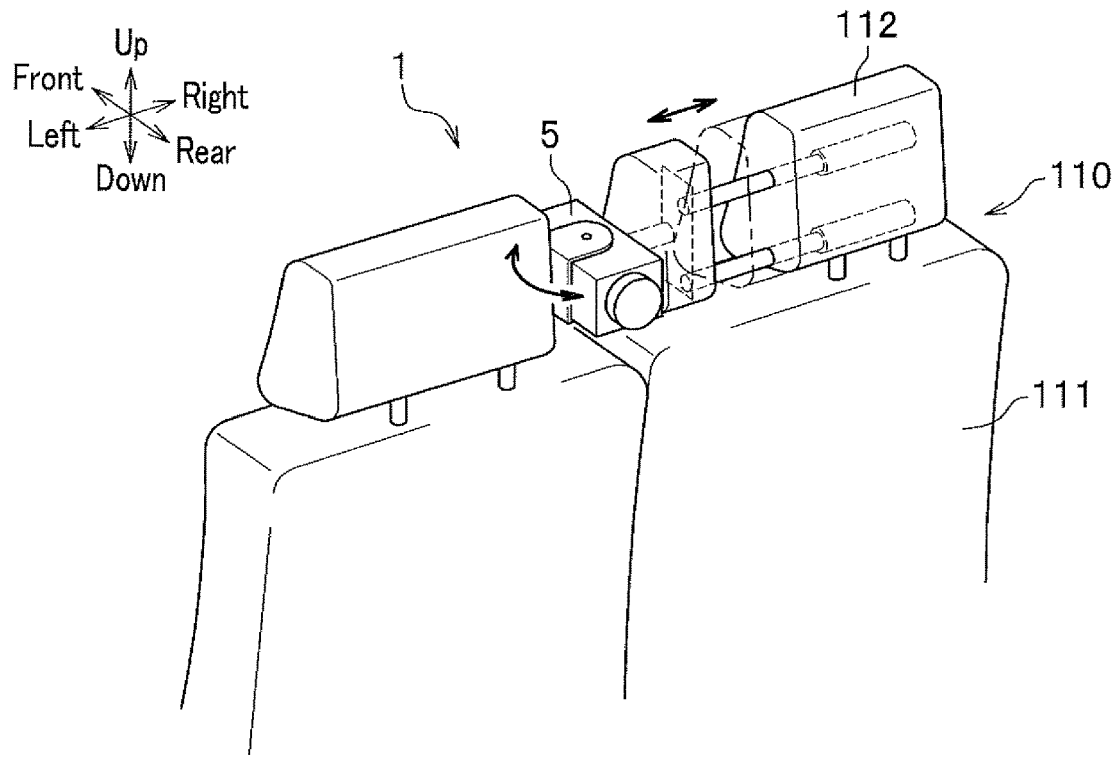
FIG. 27 is a diagram schematically showing a seventeenth setup case of the projector according to the embodiment of the present invention.

In a seventeenth setup case as shown in FIG. 27, the projector 5 is set up on the inner side in the vehicle width direction of the headrest 112 of the rear seat 110. When the projector 5 is to be used, a passenger of the vehicle withdraws the inner part in the vehicle width direction of the headrest 112 inward in the vehicle width direction, and vertically as well as horizontally adjusts the angle of the projector 5 to make the projector 5 ready to project images or videos onto the liquid crystal unit 10A provided in the rear window 2.

<Eighteenth Setup Case>

Figure 28:
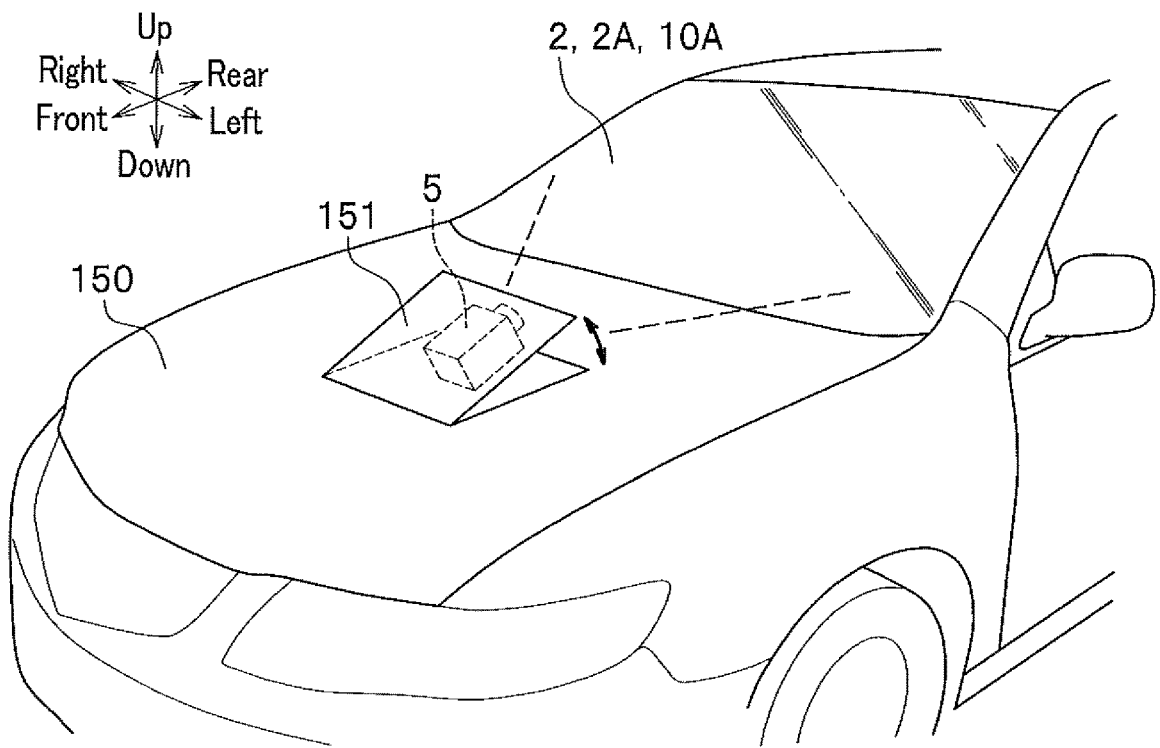
FIG. 28 is a diagram schematically showing an eighteenth setup case of the projector according to the embodiment of the present invention.

In an eighteenth setup case as shown in FIG. 28, the projector 5 is set up on a lid 151 of a hood 150 of a power source chamber at the front of the vehicle. The base end (front end when stored) of the lid 151 is connected to the main body of the hood 150 via a hinge or the like, and the projector 5 is mounted on one surface (lower surface when stored) of the lid 151. When the projector 5 is to be used, a passenger of the vehicle pivots the lid 151 upward and frontward by a button operation or the like so as to be opened, to make the projector 5 ready to project images or videos from the outside of the vehicle compartment onto the liquid crystal unit 10A provided in the front window 2. Note that the shape of the lid 151, the connection structure of the lid 151 to the hood 150, and the like are not limited to those described above and illustrated in the drawing.

<Nineteenth Setup Case>

Figure 29:
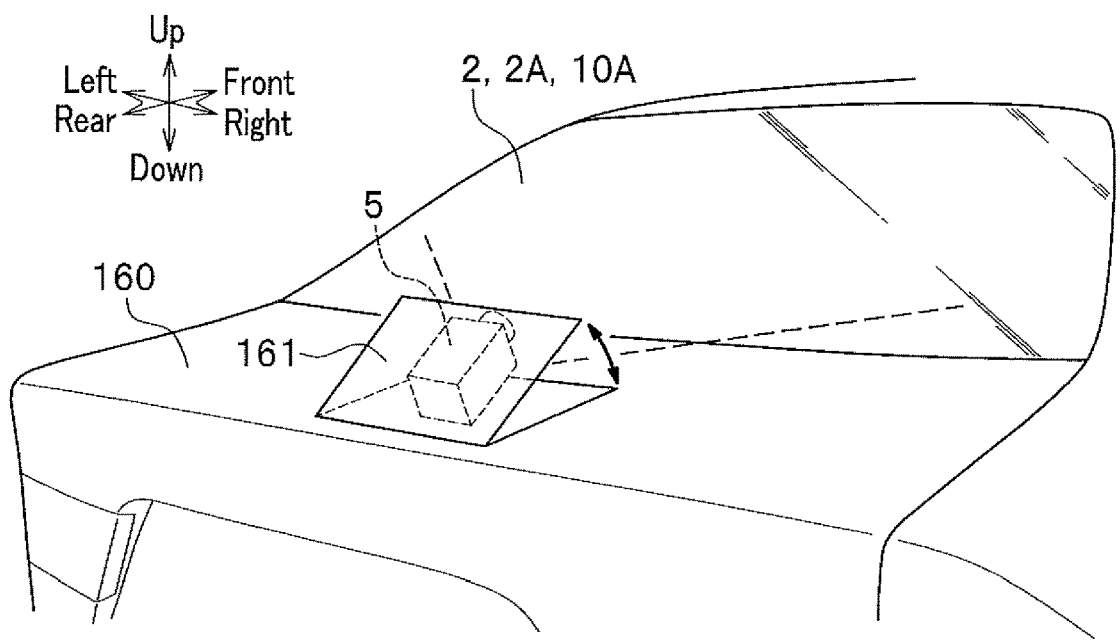
FIG. 29 is a diagram schematically showing a nineteenth diagram of the projector according to the embodiment of the present invention.

In a nineteenth setup case as shown in FIG. 29, the projector 5 is set up on a lid 161 of a hood 160 of the trunk room at the rear of the vehicle. The base end (rear end when stored) of the lid 161 is connected to the main body of the hood 160 via a hinge or the like, and the projector 5 is mounted on one surface (lower surface when stored) of the lid 161. When the projector 5 is to be used, a passenger of the vehicle pivots the lid 161 upward and rearward by a button operation or the like so as to be opened, to make the projector 5 ready to project images or videos from the outside of the vehicle compartment onto the liquid crystal unit 10A provided in the rear window 2. Note that the shape of the lid 161, the connection structure of the lid 161 to the hood 160, and the like are not limited to those described above and illustrated in the drawing.

Hereinabove, the embodiments of the present invention have been described, but the present invention is not limited to the embodiments and appropriately modifiable within a scope not departing from the gist of the present invention. For example, the vehicular display system may be configured to appropriately combine the respective embodiments. In addition, the control unit 4 may determine, on the basis of the detection results of such as a wheel speed detector to detect the wheel speed of the vehicle and a shift lever position detector to detect the operation position of the shift lever of the vehicle, that the vehicle is parked (the speed of the vehicle calculated based on the wheel speed is zero, the shift lever is in the parking position, and the like) or travelling, to control the liquid crystal units 10A to 10C and the projector 5 based on the determination results. Further, in the window 2A of the first embodiment, the intermediate film 2c may be omitted and the liquid crystal unit 10A may be provided in the place of the intermediate film 2c.

The invention claimed is:

1. A vehicular display system comprising:
a window that is a transparent plate mounted on a vehicle;
a liquid crystal unit that is arranged on the inner surface, in the inside/outside direction of the vehicle, of the window and has changeable levels of transparency;
a projector that projects images or videos onto the liquid crystal unit; and
a control unit that controls the liquid crystal unit and the projector,
wherein
the control unit controls the projector in a state of the liquid crystal unit being translucent, to cause the projector to project images or videos onto the liquid crystal unit,
the liquid crystal unit includes:
a first liquid crystal unit that is provided on the inner side, in the inside/outside direction of the vehicle, of the window; and
a second liquid crystal unit that is provided on the inner side, in the inside/outside direction of the vehicle, of the first liquid crystal unit so as to be separated from the first liquid crystal unit, and
the control unit controls the first liquid crystal unit and the second liquid crystal unit, and controls the projector, in the state of the second liquid crystal unit being translucent, so that images or videos are displayed on the second liquid crystal unit,
the first liquid crystal unit can be set to have a darker color tone or a lower transparency level than the second liquid crystal unit.

2. The vehicular display system according to claim 1, further comprising:
a front window as the window; and
a rearview mirror that is provided in back of the front window,
wherein the rearview mirror can be housed so as to run along a ceiling surface of the vehicle.

3. A vehicular display system, comprising:
a window that is a transparent plate mounted on a vehicle;
a liquid crystal unit that is arranged on the inner surface, in the inside/outside direction of the vehicle, of the window and has changeable levels of transparency;
a projector that projects images or videos onto the liquid crystal unit; and
a control unit that controls the liquid crystal unit and the projector,
a front door window as the window; and
a rearward view imager that images rearward view of the vehicle,
wherein
the control unit controls the projector in a state of the liquid crystal unit being translucent, to cause the projector to project images or videos onto the liquid crystal unit;
the liquid crystal unit includes:
a third liquid crystal unit that is provided on the inner side, in the inside/outside direction of the vehicle, of a front door window; and
a fourth liquid crystal unit that is provided on the inner side, in the inside/outside direction of the vehicle, of a part of the third liquid crystal unit, and
the control unit controls the third liquid crystal unit, the fourth liquid crystal unit, and the projector so that the imaged result by the rearward view imager is displayed on the fourth liquid crystal unit, in the state that the third liquid crystal unit has higher transparency than the fourth liquid crystal unit.

4. The vehicular display system according to claim 1, further comprising:
a frontward view imager that images frontward view of the vehicle, wherein the control unit controls the projector so that the imaged result by the frontward view imager is displayed on an interior member provided on a surface of a front pillar which faces the vehicle compartment.

5. The vehicular display system according to claim 1, further comprising:
a position detector that detects the position on the surface of the liquid crystal unit touched by a passenger,
wherein the control unit controls the projector based on the detection result by the position detector.

6. The vehicular display system according to claim 1, further comprising at least one of:
a steering angle detector that detects a steering angle of a steering wheel of the vehicle;
an accelerator operation amount detector that detects an operation amount of an accelerator pedal of the vehicle;
a brake operation amount detector that detects an operation amount of a brake pedal of the vehicle; and
a gear position detector that detects a gear position of a transmission of the vehicle,
wherein the control unit controls the projector based on at least one detection result by the steering angle detector, the accelerator operation amount detector, the brake operation amount detector, and the gear position detector.

7. The vehicular display system according to claim 1, wherein
the control unit controls the liquid crystal unit and the projector to display images or videos for people outside of the vehicle.

8. The vehicular display system according to claim 7, further comprising at least one of:
a sound generator that generates sound for people outside the vehicle; and
an aroma generator that generates aroma for people outside the vehicle,
wherein the control unit controls at least one of the sound generator and the aroma generator in conjunction with images or videos.

* * * * *